United States Patent
Fan et al.

(10) Patent No.: US 8,437,298 B2
(45) Date of Patent: May 7, 2013

(54) METHODS AND APPARATUS FOR BLIND INTERFERENCE DECREASE/CANCELLATION TECHNIQUES

(75) Inventors: Zhifei Fan, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 12/844,682

(22) Filed: Jul. 27, 2010

(65) Prior Publication Data

US 2011/0044269 A1 Feb. 24, 2011

Related U.S. Application Data

(60) Provisional application No. 61/229,699, filed on Jul. 29, 2009.

(51) Int. Cl.
*H04W 4/00* (2009.01)
*H04L 12/28* (2006.01)
*H04L 12/56* (2006.01)
*H04W 40/00* (2009.01)

(52) U.S. Cl.
USPC .......................... 370/329; 370/400; 455/446

(58) Field of Classification Search ................. None
See application file for complete search history.

(56) References Cited

U.S. PATENT DOCUMENTS

| | | | |
|---|---|---|---|
| 7,263,140 B2 * | 8/2007 | Henttu | 375/340 |
| 7,978,748 B2 * | 7/2011 | Kaiser et al. | 375/137 |
| 8,036,325 B2 * | 10/2011 | Chitrapu et al. | 375/346 |
| 2002/0027957 A1 | 3/2002 | Paulraj et al. | |
| 2010/0016012 A1 * | 1/2010 | Valadon | 455/550.1 |
| 2010/0039948 A1 * | 2/2010 | Agrawal et al. | 370/252 |
| 2010/0202410 A1 * | 8/2010 | Watanabe et al. | 370/331 |

FOREIGN PATENT DOCUMENTS

WO WO 2007103444 * 9/2007

OTHER PUBLICATIONS

Binhuetal: "Time-and Frequency-Domain-Spread Generalized Multicarrier DS-CDMA Using Subspace-Based Blind and Group-Blind Space8 Time Mul ti user Detection" IEEE Transactions on Vehicular Technology, IEEE Service Center, Piscataway, NJ, US Lnkd- DO1 : 10.1109/TVT. 2008.917231, vol. 57, No. 5, Sep. 1, 2008, pp. 3235-3241, XP011224868 ISSN: 0018-9545.

International Search Report and Written Opinion—PCT/US2010/043797, International Search Authority—European Patent Office—Oct. 21, 2010.

Jae-Chon Yu: "Group-Blind Multiuser Detection for CDMA Systems" Masters Thesis, Department of Electrical and Computer Engineering, Calgary, Alberta, Canada Jan. 1, 2001, XP002604526.

* cited by examiner

*Primary Examiner* — Ayaz Sheikh
*Assistant Examiner* — Blanche Wong
(74) *Attorney, Agent, or Firm* — Nerrie M. Zohn

(57) ABSTRACT

A method, an apparatus, and a computer program product for wireless communication are provided in which one or more semi-static parameters associated with at least one neighboring eNode B (eNB) and an interfering user equipment (UE) are detected, at an eNB, and a blind interference reduction scheme based on the one or more detected semi-static parameters to reduce a signal from the interfering UE is applied.

72 Claims, 15 Drawing Sheets

METHODS AND APPARATUS FOR BLIND INTERFERENCE DECREASE/CANCELLATION TECHNIQUES

CROSS-REFERENCE TO RELATED APPLICATION(S)

This application claims the benefit of U.S. Provisional Application Ser. No. 61/229,699, entitled "BLIND INTERFERENCE CANCELLATION TECHNIQUES," filed on Jul. 29, 2009, which is expressly incorporated by reference herein in its entirety.

BACKGROUND

1. Field

The present disclosure relates generally to communication systems, and more particularly, to a techniques of interference decrease/cancellation and blind techniques of interference decrease/cancellation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more aspects and corresponding disclosure thereof, various aspects are described in connection with supporting wireless communications. According to an aspect, a method of wireless communication is provided. The method can comprise detecting, at an eNode B (eNB), one or more semi-static parameters associated with at least one neighboring eNB and an interfering user equipment (UE). Further, the method can comprise reducing signal interference from a signal generated by the interfering UE by applying a blind interference reduction scheme based on the one or more detected semi-static parameters.

Yet another aspect relates to an apparatus. The apparatus can comprise means for detecting, at an eNB, one or more semi-static parameters associated with at least one neighboring eNB and an interfering UE. The apparatus can further comprise means for reducing signal interference from a signal generated by the interfering UE by applying a blind interference reduction scheme based on the one or more detected semi-static parameters.

Another aspect relates to a computer program product comprising a computer-readable medium. The computer-readable medium may comprise code for detecting, at an eNB, one or more semi-static parameters associated with at least one neighboring eNB and an interfering UE. Further, the computer-readable medium may comprise code for reducing signal interference from a signal generated by the interfering UE by applying a blind interference reduction scheme based on the one or more detected semi-static parameters.

Another aspect may relate to an apparatus for wireless communication. The apparatus may comprise at least one processor and a memory coupled to the at least one processor. The at least one processor may be configured to detect, at an eNB, one or more semi-static parameters associated with at least one neighboring eNB and an interfering UE. The apparatus may apply a blind interference reduction scheme based on the one or more detected semi-static parameters to reduce a signal from the interfering UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
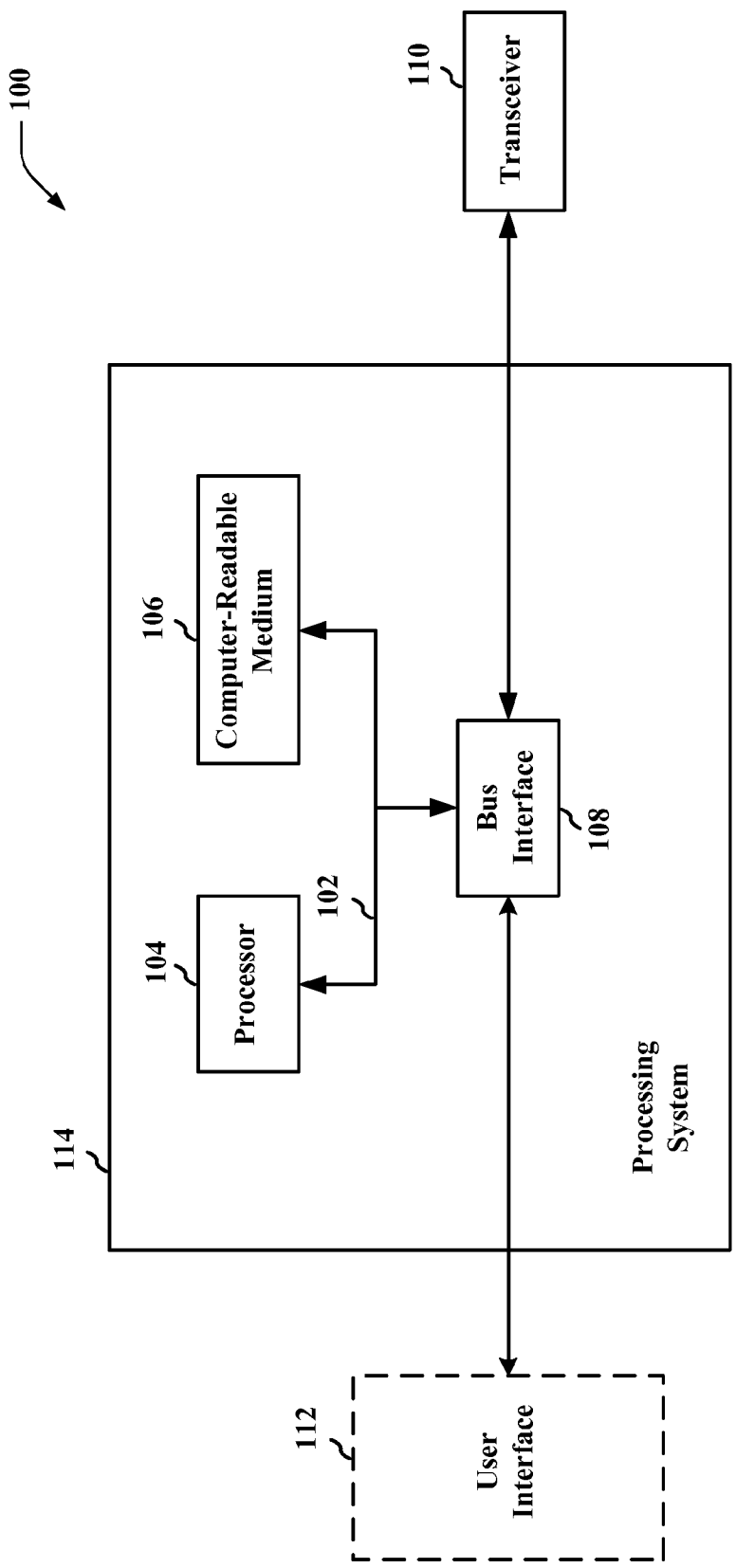
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
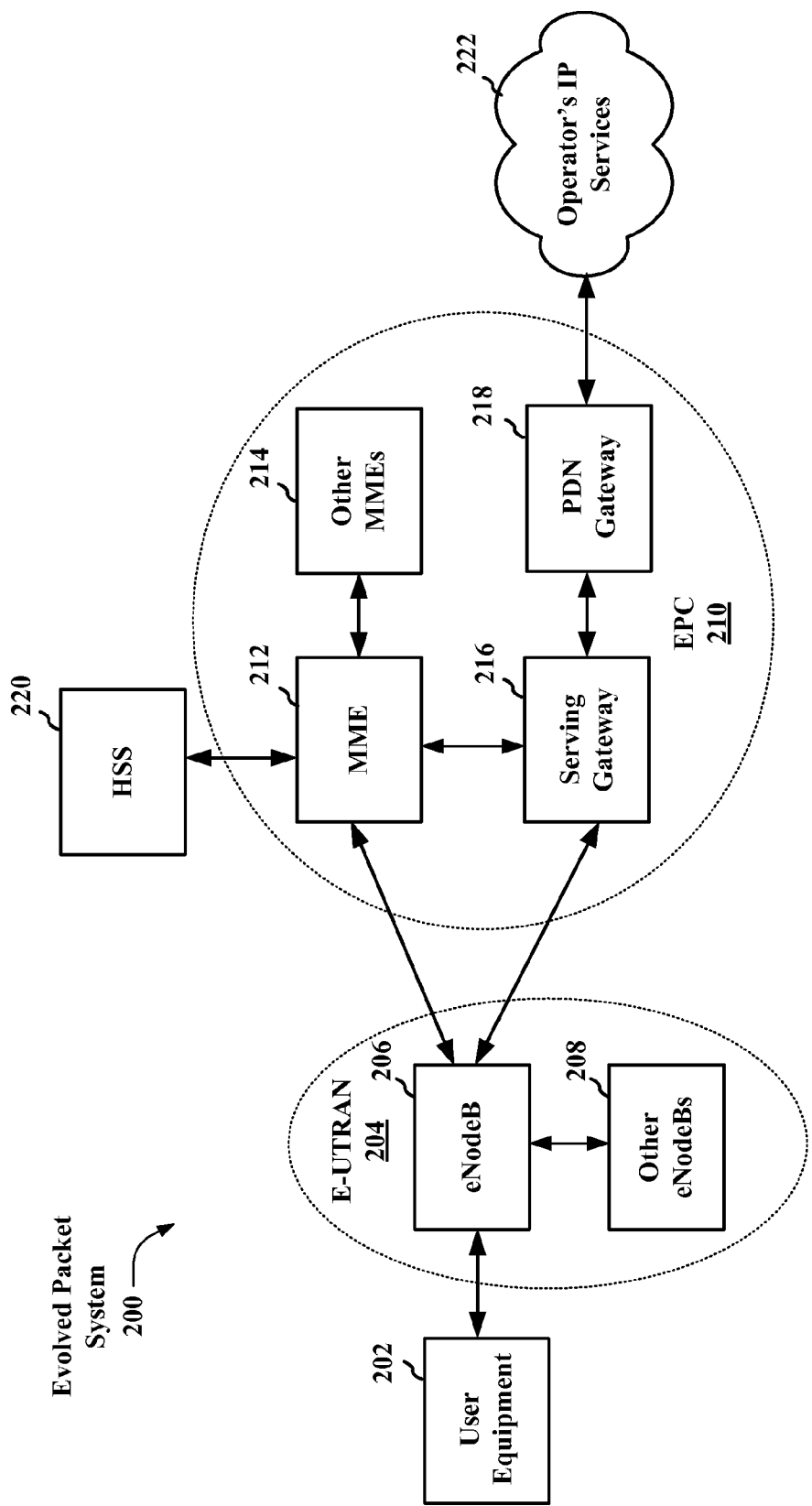
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more UE 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
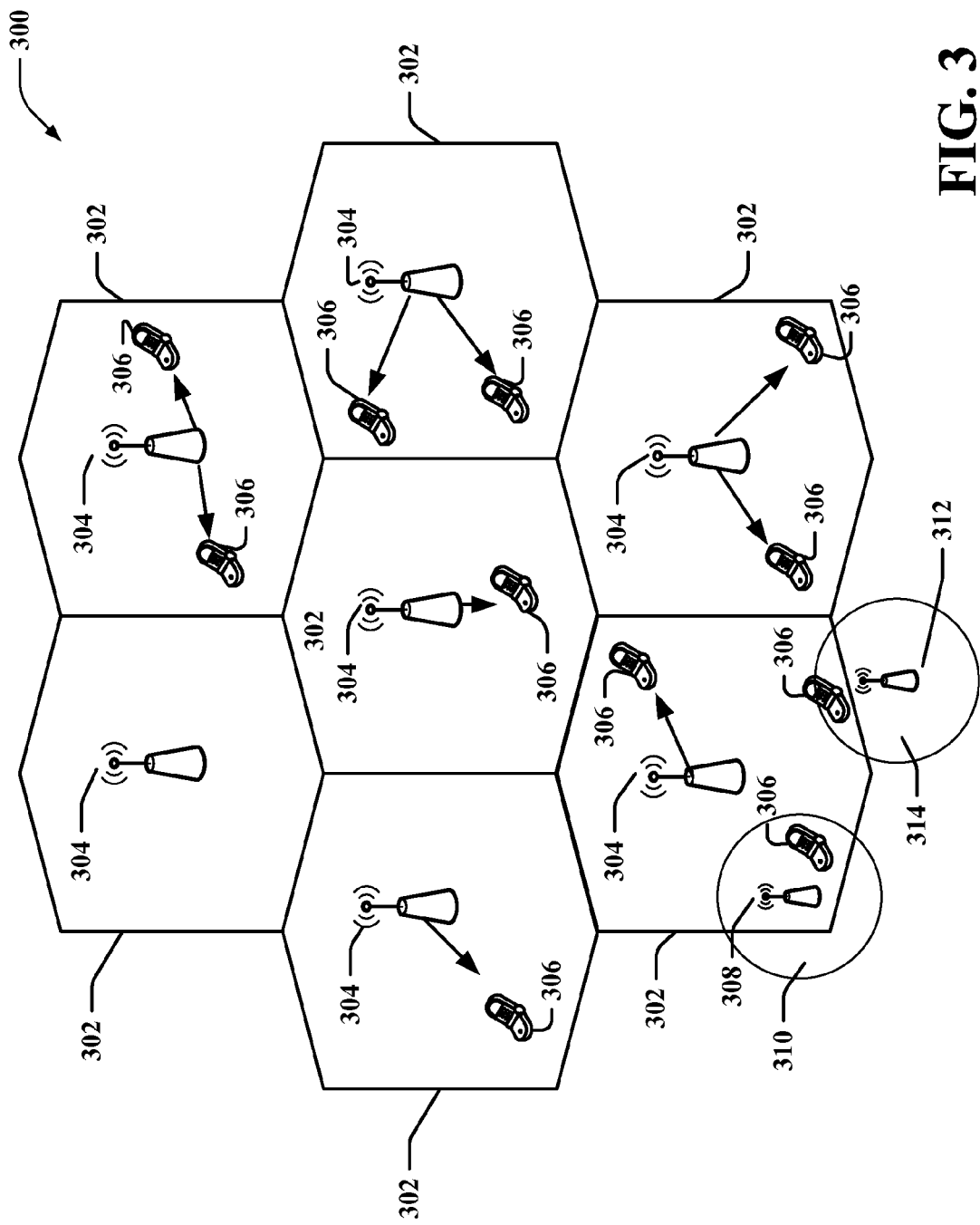
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
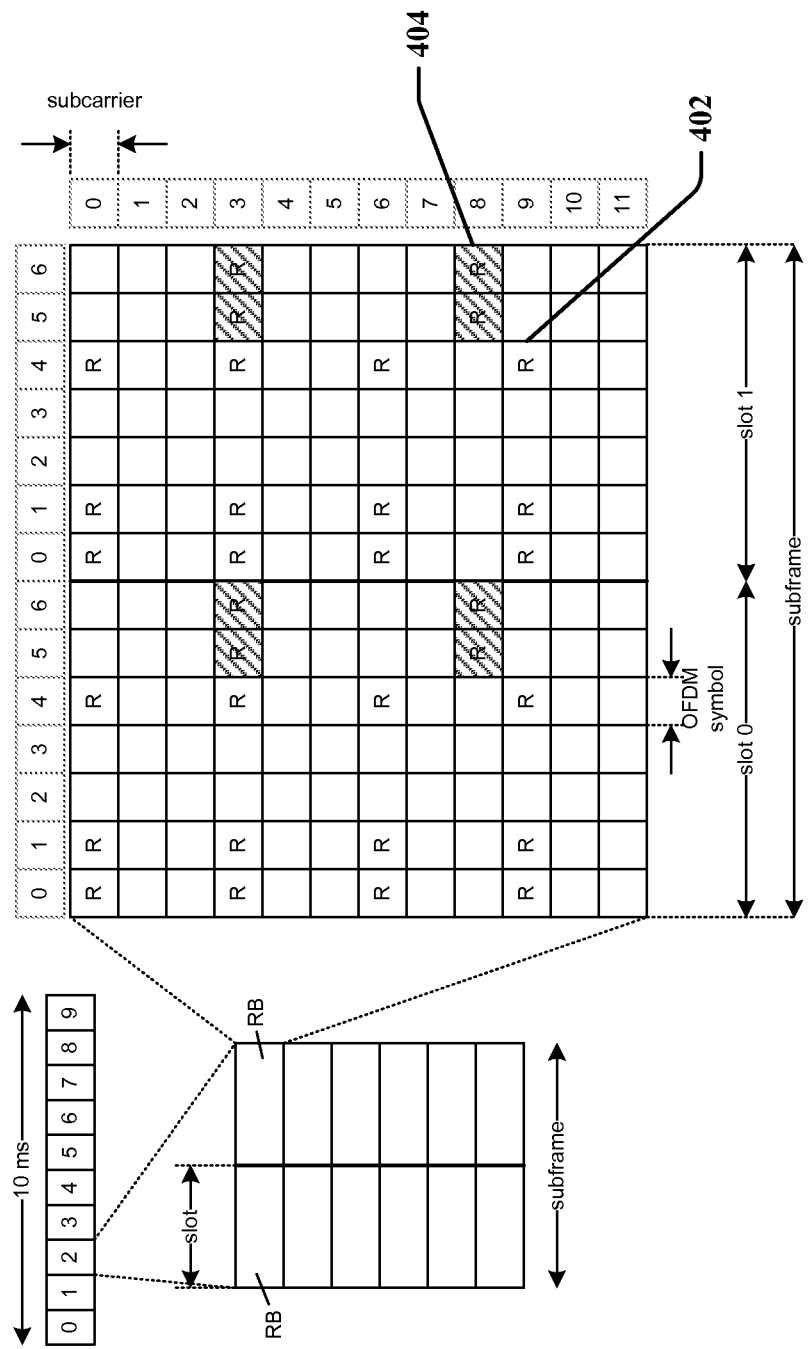
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. However, it will appreciated that the grid is not limited to 12 consecutive subcarriers in the frequency domain and 7 consecutive OFDM symbols in the time domain For example, the time domain may include 3 or 6 symbols or any applicable number of symbols. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
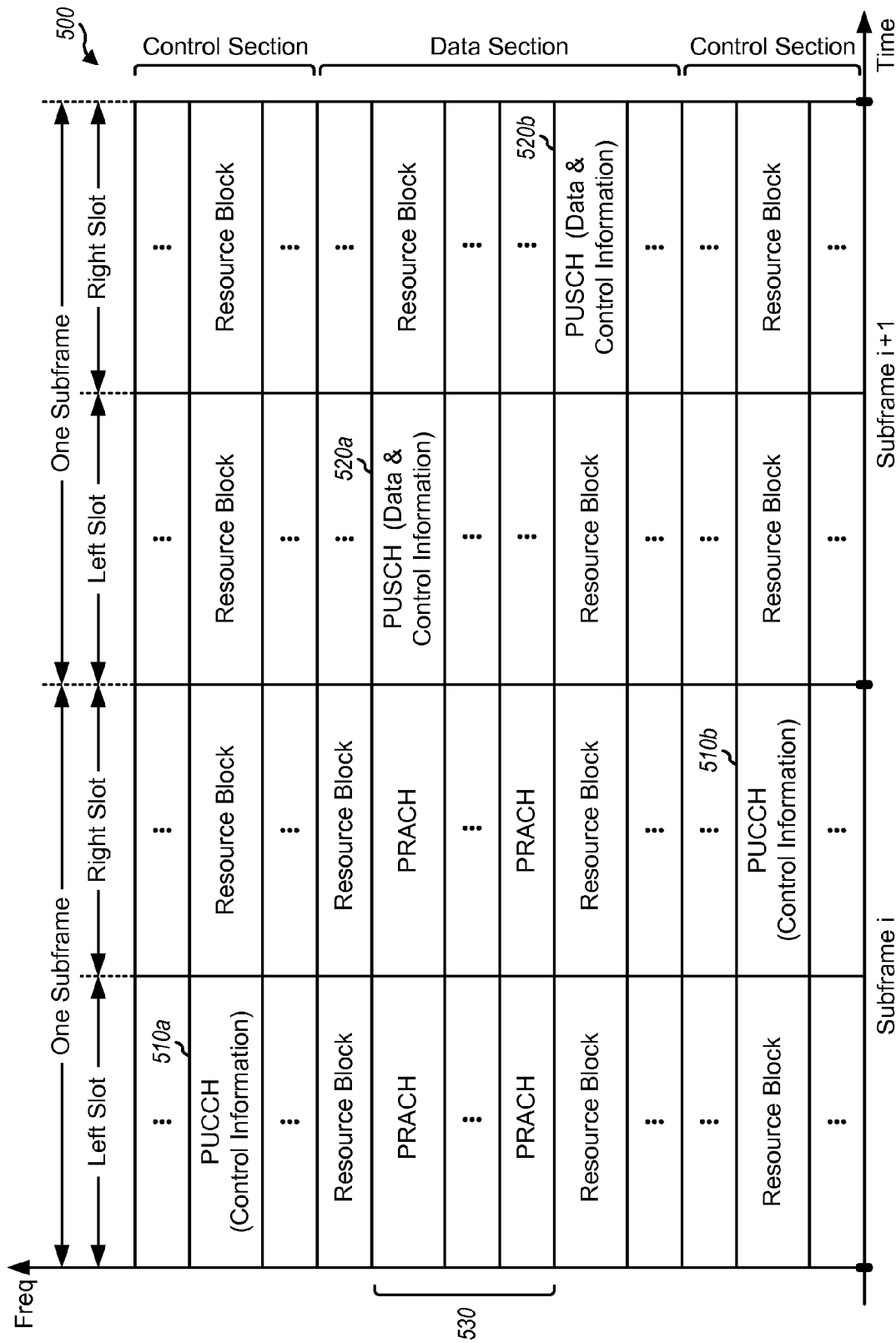
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
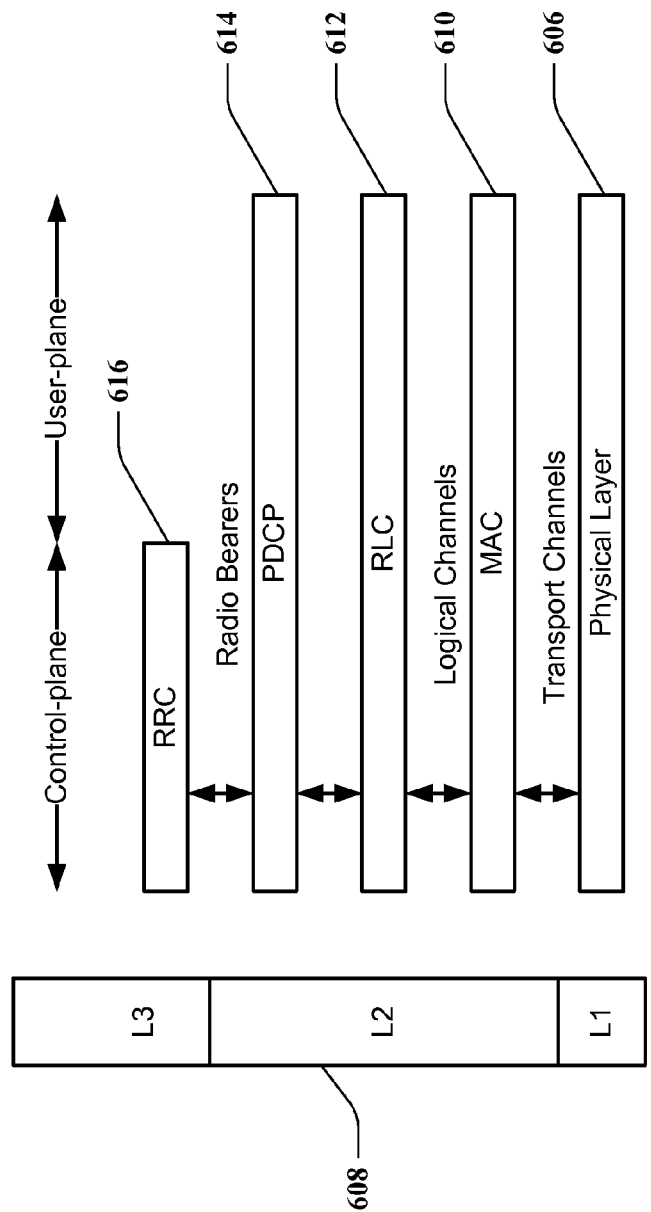
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
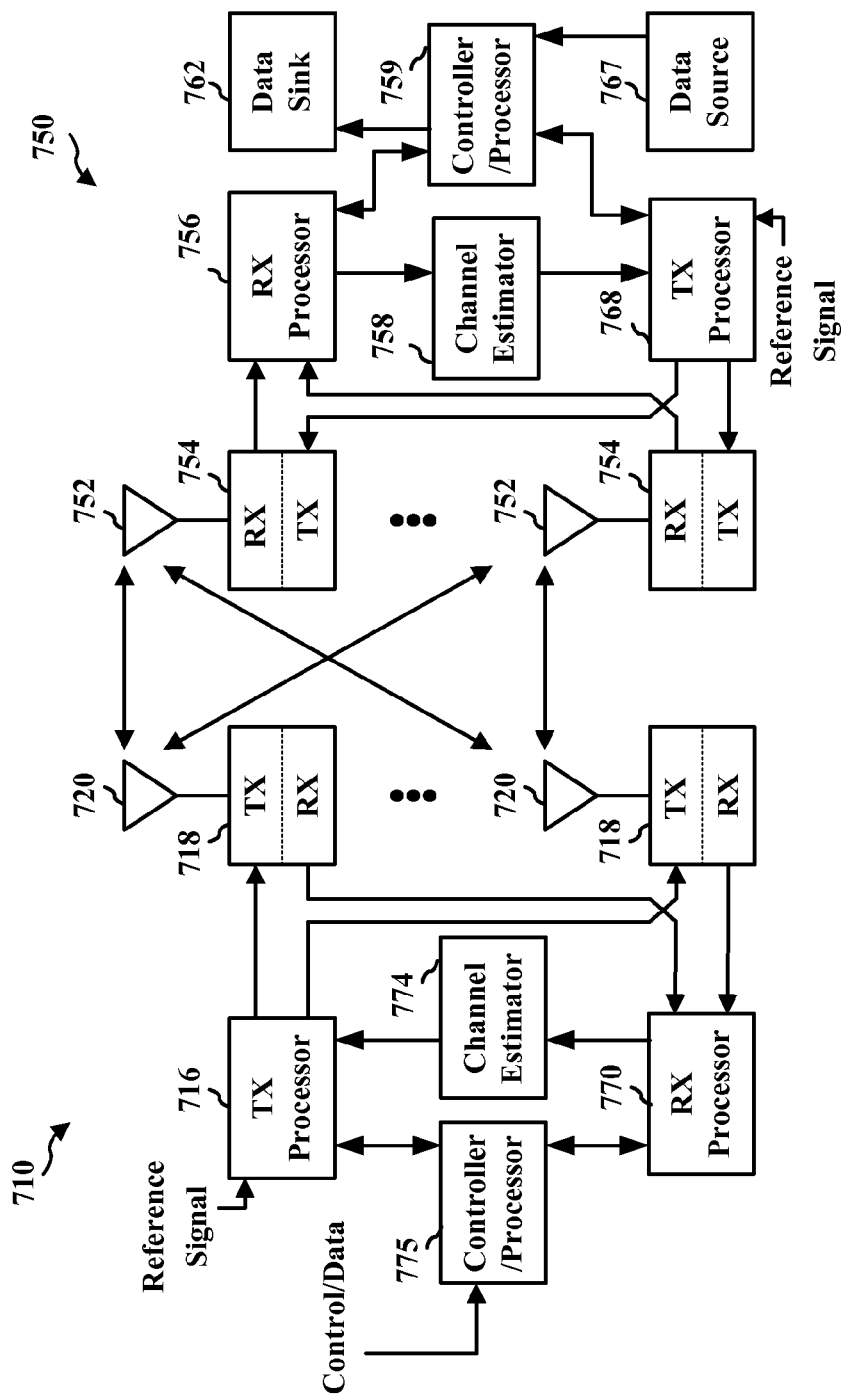
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 114 described in relation to FIG. 1 includes the eNB 710. In particular, the processing system 114 includes the TX processor 716, the RX processor 770, and the controller/processor 775.

Figure 8:
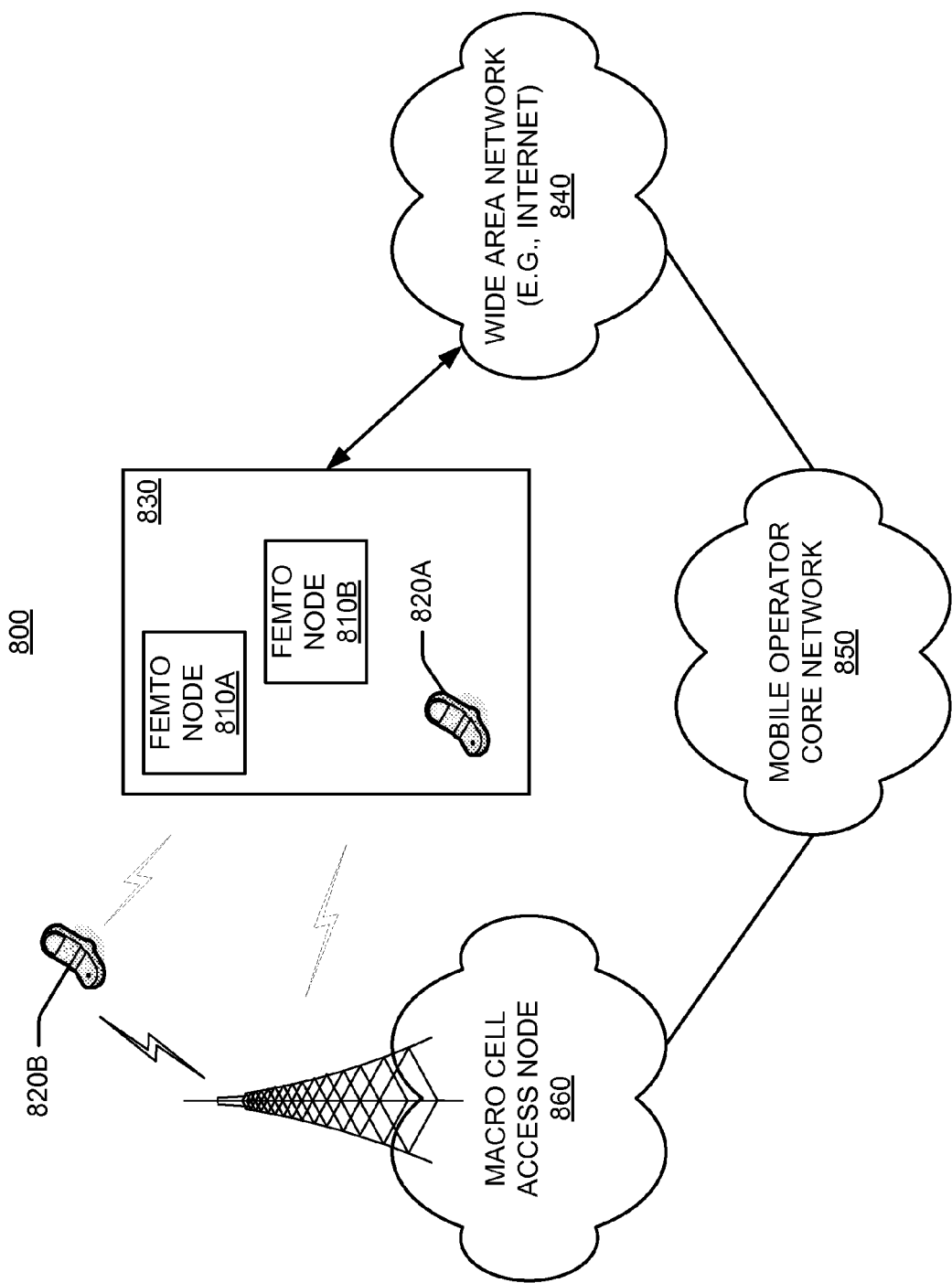
FIG. 8 illustrates an exemplary communication system where one or more femto nodes are deployed within a network environment.

FIG. 8 illustrates an exemplary communication system 800 where one or more femto nodes are deployed within a network environment. Specifically, the system 800 includes multiple femto nodes 810 (e.g., femto nodes 810A and 810B) installed in a relatively small scale network environment (e.g., in one or more user residences 830). Each femto node 810 may be coupled to a wide area network 840 (e.g., the Internet) and a mobile operator core network 850 via a DSL router, a cable modem, a wireless link, or other connectivity means (not shown). As will be discussed below, each femto node 810 may be configured to serve associated access terminals 820 (e.g., access terminal 820A) and, optionally, alien access terminals 820 (e.g., access terminal 820B). In other words, access to femto nodes 810 may be restricted whereby a given access terminal 820 may be served by a set of designated (e.g., home) femto node(s) 810 but may not be served by any non-designated femto nodes 810 (e.g., a neighbor's femto node 810).

Figure 9:
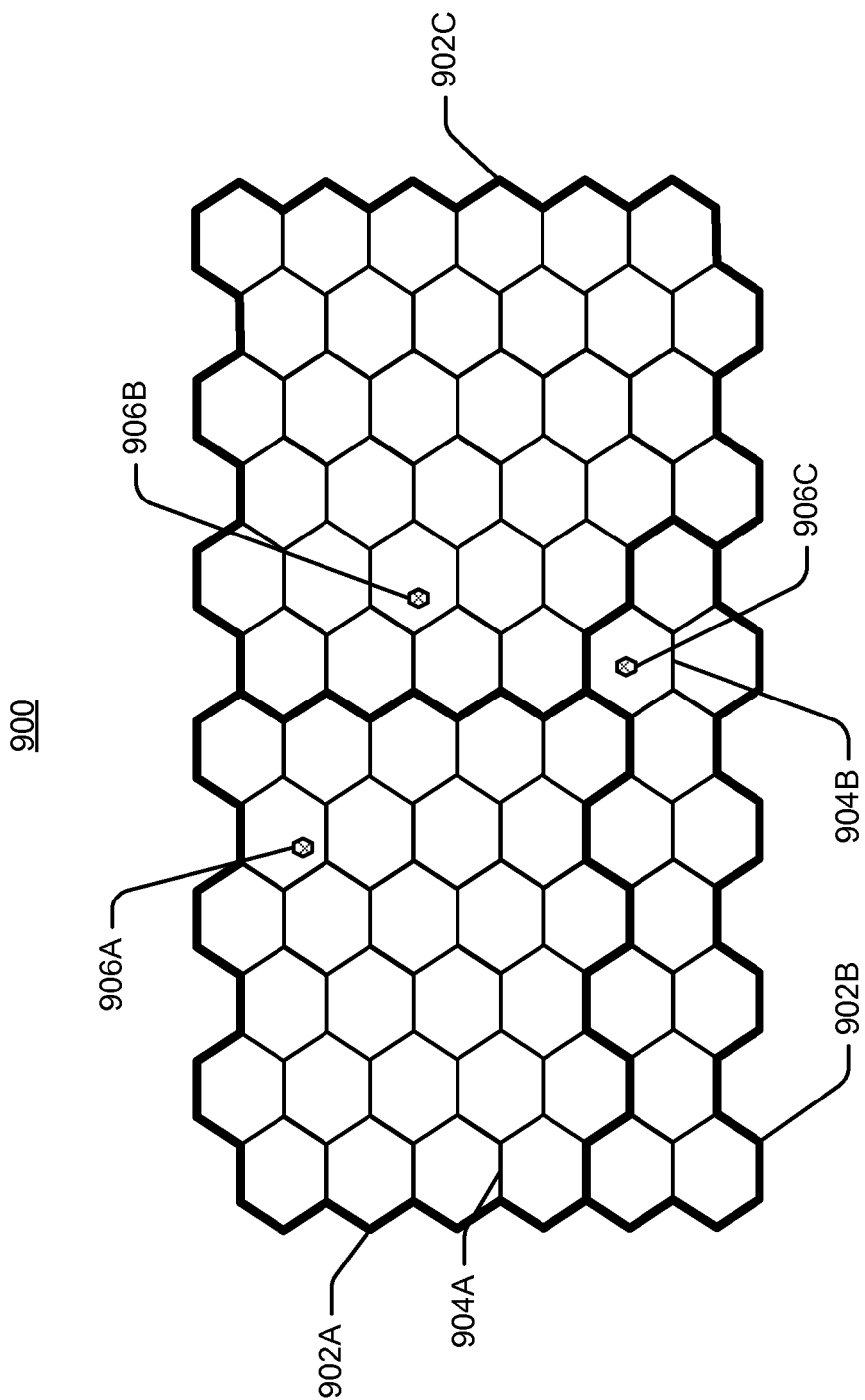
FIG. 9 illustrates an example of a coverage map where several tracking areas are defined, each of which includes several macro coverage areas.

FIG. 9 illustrates an example of a coverage map 900 where several tracking areas 902 (or routing areas or location areas) are defined, each of which includes several macro coverage areas 904. Areas of coverage associated with tracking areas 902A, 902B, and 902C are delineated by the wide lines and the macro coverage areas 904 are represented by the hexagons. The tracking areas 902 also include femto coverage areas 906. In this example, each of the femto coverage areas 906 (e.g., femto coverage area 906C) is depicted within a macro coverage area 904 (e.g., macro coverage area 904B). It should be appreciated, however, that a femto coverage area 906 may not lie entirely within a macro coverage area 904. In practice, a large number of femto coverage areas 906 may be defined with a given tracking area 902 or macro coverage area 904. Also, one or more pico coverage areas (not shown) may be defined within a given tracking area 902 or macro coverage area 904.

Referring again to FIG. 8, the owner of a femto node 810 may subscribe to a mobile service, such as, for example, a 3G mobile service, offered through the mobile operator core network 850. In addition, an access terminal 820 may be capable of operating both in macro environments and in smaller scale (e.g., residential) network environments. In other words, depending on the current location of the access terminal 820, the access terminal 820 may be served by an access node 860 of the mobile operator core network 850 or by any one of a set of femto nodes 810 (e.g., the femto nodes 810A and 810B that reside within a corresponding user residence 830). For example, when a subscriber is outside his home, he is served by a standard macro access node (e.g., node 860) and when the subscriber is at home, he is served by a femto node (e.g., node 810A). It should be appreciated that a femto node 810 may be backward compatible with existing access terminals 820.

A femto node 810 may be deployed on a single frequency or, in the alternative, on multiple frequencies. Depending on the particular configuration, the single frequency or one or more of the multiple frequencies may overlap with one or more frequencies used by a macro node (e.g., node 860).

In some aspects, an access terminal 820 may be configured to connect to a preferred femto node (e.g., the home femto node of the access terminal 820) whenever such connectivity is possible. For example, whenever the access terminal 820 is within the user's residence 830, it may be desired that the access terminal 820 communicate only with the home femto node 810.

In some aspects, if the access terminal 820 operates within the mobile operator core network 850 but is not residing on its most preferred network (e.g., as defined in a preferred roaming list), the access terminal 820 may continue to search for the most preferred network (e.g., the preferred femto node 810) using a Better System Reselection ("BSR"), which may involve a periodic scanning of available systems to determine whether better systems are currently available, and subsequent efforts to associate with such preferred systems. With an acquisition entry, the access terminal 820 may limit the search for specific band and channel. For example, the search for the most preferred system may be repeated periodically. Upon discovery of a preferred femto node 810, the access terminal 820 selects the femto node 810 upon which to camp within its coverage area.

In one aspect access to a femto node 810 may be restricted. For example, a given femto node 810 may only provide certain services to certain access terminals 820. In deployments with so-called restricted (or closed) association, a given access terminal 820 may only be served by the macro cell mobile network and a defined set of femto nodes (e.g., the femto nodes 810 that reside within the corresponding user residence 830). In some implementations, a node may be restricted not to provide, for at least one node, at least one of: signaling, data access, registration, paging, or service.

In some aspects, a restricted femto node (e.g., a Closed Subscriber Group (CSG) Home NodeB) is one that provides service to a restricted provisioned set of access terminals. This set may be temporarily or permanently extended as necessary. In some aspects, a CSG may be defined as the set of access nodes (e.g., femto nodes) that share a common access control list of access terminals. A channel on which all femto nodes (or all restricted femto nodes) in a region operate may be referred to as a femto channel.

Various relationships may thus exist between a femto node and an access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal may be temporarily authorized to access or upon which the access terminal may operate. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionalities in the context of a femto node. It should be appreciated, however, that another node, such as, for example, a pico node, may provide the same or similar functionality for a coverage area. For example, a pico node may provide coverage as a restricted a home node, or may be defined for a given access terminal. Other suitable variations are possible and considered part of the present invention.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). Generally, as an access terminal moves through such a network, the access terminal may be served in certain locations by access nodes that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node.

A cell associated with a macro node, a femto node, or a pico node may be referred to as a macro cell, a femto cell, or a pico cell, respectively. In some implementations, each cell may be further associated with (e.g., divided into) one or more sectors.

In various implementations, other terminologies may be used to reference a macro node, a femto node, or a pico node. For example, a macro node may be configured or referred to as an access node, base station, access point, eNB, macro cell, etc. Also, a femto node may be configured or referred to as a home NodeB, home eNB, access point base station, femto cell, etc.

In heterogeneous network deployment, (a network having more than a single type of base station (for example, macro, pico and femto eNBs)) restricted association to some eNBs may lead to UL interference. As used herein, a "macro UE" may refer to a UE that is only authorized/capable of communicating with a macro eNB. Further, as used herein a "femto eNB" may refer to a small cellular base station, typically designed for use in residential or small business environments. In one aspect, a macro UE in close proximity to a "femto eNB," and with a transmit power stronger than a femto UE may cause UL interference for communications intended for the femto eNB. In one aspect, if UL channels of both a macro UE and a femto UE collide or interfere, then the interference may be strong enough to prevent the femto eNB from decoding signals from the femto UE.

In operation, as a network may not be operable to provide for re-transmission for control channels (e.g., PUCCH), collisions between control channels may cause more severe performance impact than that of collisions between shared channels (e.g., PUSCH). Interference decrease/cancellation methods are presented herein in the case, among others, where a channel quality indicator (CQI), such as PUCCH CQI, collides with CQIs transmitted from other UEs.

In one aspect, a collision between UL control channels (e.g., PUCCH) may occur where there are a limited number of resource blocks (RBs) that may be dedicated by one or more eNBs for transmission of control channel information (e.g., PUCCH CQI). The same or similar logic may be applied to a pico eNB and/or a macro eNB such that, besides these few RBs for femto eNB, a few RBs could be allocated for UL transmissions (e.g., PUCCH CQI) to a pico eNB, and a few RBs could be allocated for UL transmissions (e.g., PUCCH CQI) to a macro eNB.

In one aspect, a femto eNB may serve fewer users than a macro eNB or a pico eNB. In another aspect, a CQI transmission may be periodic where the periodicity may be different for different UEs. Further, as a transmission channel may change relatively slowly between a femto eNB and a femto UE, few RBs may be sufficient for a femto eNB to provide coverage for multiple femto UEs. In addition to the RBs used by the femto eNB and femto UE, a macro eNB and/or a pico eNB may assign more uplink control channel RBs (e.g., PUCCH RBs). The UL interference for the UL control channels assigned by the macro eNB and/or pico eNB may generally not be as severe compared to the UL interference experienced by the femto eNB.

An exemplary heterogeneous communication system (e.g., a communication system comprising a combination of macro, pico and/or femto eNBs) that is synchronous may have a cyclic prefix length that is the same for a substantial portion of the heterogeneous network. In one aspect, transmission of PUCCH CQI by UEs in the system may be constrained to one RB per slot, such that the position of pilot symbols and data symbols are the same for multiple UEs. In one aspect, both pilot and data symbols may be determined as a computer generated sequence (CGS) modulated by data. In one aspect, the modulation is Quadrature Phase Shift Keying (QPSK) and a Reed-Muller block code may be used. It is to be understood that the foregoing is merely one example of the various constraints used in any communication system and that the variations discussed herein could be applied to other communication systems having other constraints.

Figure 10:
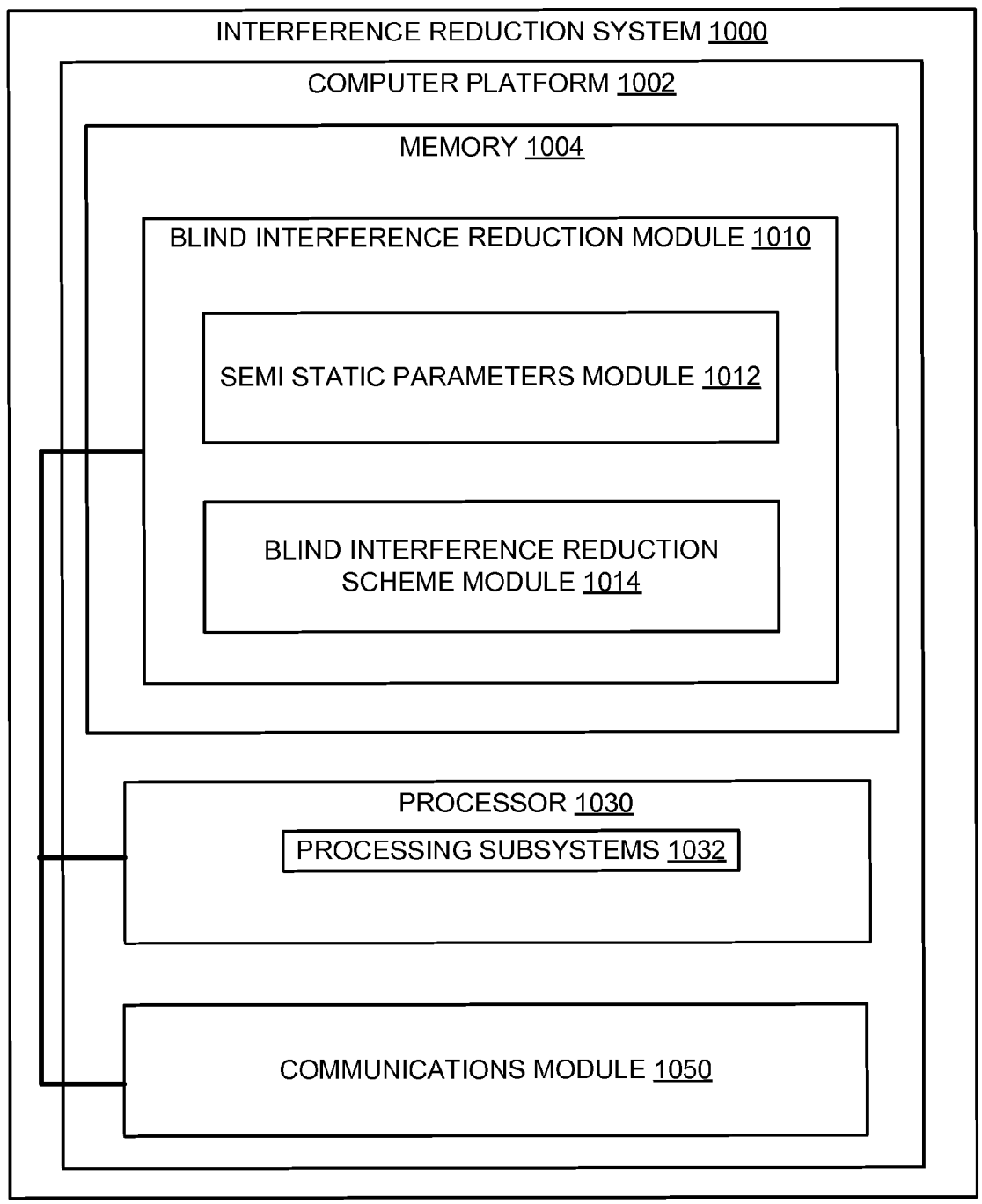
FIG. 10 illustrates exemplary block diagram of an interference reduction system according to an aspect.

With reference to FIG. 10, illustrated is a detailed block diagram of an interference reduction system 1000, such as femto eNB 810 depicted in FIG. 8. For purposes of simplicity herein, and not as limitation, a femto eNB will be referred to as the eNB who experiences interference by a macro, pico, femto, or other UE. It should be understood that the concepts and principles discussed herein could be applied to other eNBs experiencing interference from a variety of UEs.

Interference reduction system 1000 may comprise at least one of any type of hardware, server, personal computer, mini computer, mainframe computer, or any computing device either special purpose or general computing device. Further, the modules and applications described herein as being operated on or executed by interference reduction system 1000 may be executed entirely on a single network device, as shown in FIG. 8, or alternatively, in other aspects, separate servers, databases or computer devices may work in concert to provide data in usable formats to parties, and/or to provide a separate layer of control in the data flow between communications device 820 and the modules and applications executed by interference reduction system 1000.

Interference reduction system 1000 includes computer platform 1002 that can transmit and receive data across wired and wireless networks, and that can execute routines and applications. Computer platform 1002 includes memory 1004, which may comprise volatile and nonvolatile memory such as read-only and/or random-access memory (ROM and RAM), EPROM, EEPROM, flash cards, or any memory common to computer platforms. Further, memory 1004 may include one or more flash memory cells, or may be any secondary or tertiary storage device, such as magnetic media, optical media, tape, or soft or hard disk. Further, computer platform 1002 also includes processor 1030, which may be an application-specific integrated circuit ("ASIC"), or other chipset, logic circuit, or other data processing device. Processor 1030 may include various processing subsystems 1032 embodied in hardware, firmware, software, and combinations thereof, that enable the functionality of interference reduction system 1000 and the operability of the network device on a wired or wireless network.

Computer platform 1002 further includes communications module 1050 embodied in hardware, firmware, software, and combinations thereof, that enables communications among the various components of interference reduction system 1000, as well as between interference reduction system 1000, devices 820. Communication module 1050 may include the requisite hardware, firmware, software and/or combinations thereof for establishing a wireless communication connection. According to described aspects, communication module 1050 may include the necessary hardware, firmware and/or software to facilitate wireless broadcast, multicast and/or unicast communication of requested content items, control information, applications, etc.

Memory 1004 of interference reduction system 1000 includes blind interference reduction module 1010 operable for supporting interference reduction. In one aspect, blind interference reduction module 1010 may include semi-static parameters module 1012 and blind interference reduction scheme module 1014. In one aspect, blind interference reduction module 1010 may be operable to decrease and/or cancel interference signals from a received signal including a desired component and an interference signal from another UE. In one aspect, blind interference reduction module 1010 may decode a received signal, reconstruct the interference signal, and then cancel the interference signal from the received signal, leaving the desired component. In one aspect, blind interference reduction module 1010 may perform less than a 100% interference decrease/cancellation using one or more of several "blind" interference decrease/cancellation methods. As used herein, "blind" interference decrease/cancellation may refer to interference decrease/cancellation based on a reduced set of semi-static parameters available to the eNB.

In one aspect, semi-static parameters module 1012 may be operable to determine which semi-static parameters are available to enable one or more blind interference reduction schemes. In one aspect, semi-static parameters module 1012 may obtain, an eNB cell ID, a network identifier of the interfering UE, or a resource ID of the interfering UE. In another aspect, semi-static parameters module 1012 may obtain an eNB cell ID.

In one aspect, blind interference reduction module 1010 may be operable to use a limited amount of information from semi-static parameters module 1012, e.g., received during high layer signaling, such as a cell ID and a UE radio network temporary identifier (UE RNTI), and a resource ID, to derive other information used in interference decrease/cancellation. In one aspect, the UE RNTI and cell ID may remain fixed, while the resource ID is generally semi-statically configured. Exemplary quantities that might be derived by the femto eNB include a CGS root sequence, a RB location, a cyclic shift index per localized frequency division multiplexing (LFDM) symbol, and a Scrambling Sequence.

In one aspect, the femto eNB may lack the payload size and in which subframe an interfering UE may be sending PUCCH CQI. In such an aspect, blind interference reduction scheme module 1014 may be operable to provide effective interference cancellation (IC) without the knowledge of the payload size. In operation, a signal which may include both a desired signal and an interference signal may be received by the eNB. The blind interference reduction scheme module 1014 may determine an IC order of signals intended for neighbor eNBs. In one aspect, blind interference reduction scheme module 1014 may generate an estimate of the average noise observed by the eNB for each neighbor eNB with a possible interfering UE. Such possible, or suspected, interfering UEs may, for example, send CQI in the same RB location. In one aspect, the average noise may be estimated by any number of calculations to generate an average noise value. For example, the noise signal may be filtered and a simple average of the signal may be generated. The blind interference reduction scheme module 1014 may also produce a list of neighbor eNBs. This list may, for example, sort the neighbor eNBs according to the average noise coming from each of the eNBs. Such a list may, for example, be used to identify an order for eNBs to be processed as part of an IC scheme.

Further, the blind interference reduction scheme module 1014 may decode interference signals of one or more interfering UEs associated with each neighbor eNB assuming a particular payload size. In one aspect, any suitable payload size may be used. For example, a maximum payload size may be used in place of the actual, known payload size. Such a maximum payload size may, for example, correspond to a payload size of 11 bits. A payload size of 11 bits may, for example, correspond to the maximum payload size of CQI if a 20×13 block code is used to encode the information bits. Where a maximum payload size is assumed, a signal may be decoded under that assumption. If the maximum payload size is correct and, therefore, the decoding is also correct, the last several bits should be 0s if the actual payload size is less than 11. This indication can be used, for example, to gauge the effectiveness of the assumed payload size, whether the assumed payload size is maximum or less than maximum, etc.

Still further, the blind interference reduction scheme module 1014 may be operable to reconstruct a signal transmitted from the interfering UE. Any suitable reconstruction of the transmit signal of the interfering UE may be used. For example, the femto eNB may fully replicate the interference signal transmitted by an interfering UE, the femto eNB may represent portions of the signal of an interfering UE, etc.

Additionally, the blind interference reduction scheme module 1014 may be operable to detect a discontinuous transmission (DTX). In one such aspect, detecting a DTX may be done in one of a number of suitable ways including the following described process.

In the following description, the following terminology will be used. "Received Signal" may refer to the signal received by the eNB. "Interference Signal" may refer to the portion of the "Received Signal" that has been provided by a potentially interfering UE, or a number of potentially interfering UEs. "Residue Signal" may refer to the signal obtained by subtracting the Interference Signal from the Received Signal. In one aspect, the energy of the Received Signal and the energy of the Interference Signal may be calculated. These energies may be calculated by any of a number of suitable methods known in the art. The Residue Signal may be removed from the Received Signal through, for example, signal subtraction techniques. Subsequently, a ratio between the Received Signal and the Interference Signal may be calculated and compared with a threshold value. If the calculated ratio between the Received Signal and the Interference Signal is below the threshold value, this may be taken as an indication that the interference level is minor. In such an aspect, DTX may be declared, and cancellation may not be performed. Otherwise, the Interference Signal may be removed from the Received Signal through, for example, signal subtraction techniques.

In the above-described process, the femto eNB may not know whether an interfering UE is present and the payload size of a CQI being sent. The complexity of this variation is minimal when there are few strong-interfering UEs near the femto eNB who are sending the CQI at the same location.

In one aspect, blind interference reduction scheme module 1014 may be operable to facilitate IC by the eNB without the knowledge of the payload size. Additionally, the eNB may not know the resource ID. Since the resource ID is semi-statically configured, it could be, for example, that the eNB could not exchange the resource ID during high layer signaling. In such an aspect, the eNB may only have knowledge of, for example, the cell ID and UE RNTI.

A femto eNB (or "the eNB") can, for example, use a limited amount of information received during high layer signaling, such as cell ID and UE RNTI to derive other information used in interference decrease/cancellation. Exemplary quantities that might be derived by the eNB may include: CGS root sequence, common shift offsets for each LFDM symbol in a certain subframe, and the Scrambling Sequence. In this case, the femto eNB may lack certain kinds of information, such as, for example, the payload size, whether the interfering UE is sending CQI in a certain subframe, and the exact cyclic shift index per LFDM symbol.

In one aspect, the blind interference reduction scheme module 1014 may blindly determine a resource ID of a possible interfering UEs. For example, the eNB may determine the resource ID by estimating the average noise the eNB could observe from an interfering UE assuming the UE is using a particular cyclic shift index. In one of aspect, the eNB may process a subset of possible cyclic shift indices. Additionally or in the alternative, each possible cyclic index may be tried so that average noise generated by an interfering UE for each of the possible cyclic shift indices is estimated. Next the estimated noise for each of the determined possibilities may be ordered into an increasing or decreasing sequence according to their noise estimates. In one aspect, the smallest noise estimates, according to the number of strong interfering UEs for the eNB, may then be retained for further consideration. The cyclic shift indexes corresponding to these smallest noise estimates may be considered as those used by the interfering UEs.

In another aspect, the blind interference reduction scheme module 1014 may determine an interference decrease/cancellation order of the neighbor eNBs. For example, the eNB may estimate the average noise that is received from each of the neighboring eNBs with possible interfering UEs which may send CQI in the same RB location. From these estimates, the eNB may then produce a list of neighbor eNBs according to the estimated noise from small to large. The list may be used to identify the order of the interference decrease/cancellation of each neighbor eNB.

In another aspect, the blind interference reduction scheme module 1014 may blindly decode signals from each interfering UE. This decoding may proceed in at least two different ways according to the number of interfering UEs. If there is a single interfering UE, the signal of that UE could be decoded assuming a payload size is 11 (as described above), especially in a case in which the scrambling code for the interfering UE is known. Alternatively, if there is more than one interfering UE, the eNB may try a subset of each possible known scrambling code and use each of the scrambling codes to decode the signal. The eNB may also use all known scrambling codes to decode the signal. Once the signal has been decoded, the eNB may use correlations calculated during the decoding process to pick an appropriate scrambling code based on a finding of a correlation and use the scrambling code in the decoding process. During this procedure, the eNB may, for example, assume the payload size is 11, or may assume another appropriate payload size.

In another aspect, the blind interference reduction scheme module 1014 may not know the RB location of the interfering UE, and as such the femto eNB may perform decrease/cancellation for each strong interfering UE. The complexity is, therefore, generally higher than in the first variation. In another aspect, the eNB may know the cell ID of the neighbor eNB, but not the UE RNTI and resource IDs.

A femto eNB (or "the eNB") can, for example, use a limited amount of information received during high layer signaling, such as cell ID to derive other information used in interference decrease/cancellation. Exemplary quantities that might be derived by the eNB include: CGS root sequence and the Common shift offsets for each LFDM symbol in a certain subframe. In this case, the femto eNB may lack certain kinds of information, such as, for example: the payload size, whether the interfering UE is sending CQI in a certain subframe, the cyclic shift index per LFDM symbol, and the scrambling sequence.

In such an aspect, a signal comprising both a desired signal and an interference signal may be received by the eNB. The blind interference reduction scheme module 1014 may determine an interference decrease/cancellation order of the neighbor eNBs, as discussed above.

In another aspect, the blind interference reduction scheme module 1014 may decode the signal of each strong interfering UE using a log-likelihood ratio (LLR). In one aspect, since the RNTI of this UE is unknown, the scrambling code is also unknown, preventing descrambling of the LLR. In such an aspect, the eNB may reconstruct the transmit signal of the interfering UE by using any of the suitable processed discussed herein, as well as from LLR (as described above) using hard or soft processes.

In another aspect, since the femto eNB may be unaware of the RB location of the interfering UE, interference decrease/cancellation may be performed for each strong interfering UE, while the femto eNB may not decode the information bits. The complexity of this variation may generally be higher than the first previously discussed aspects but generally lower than the second discussed aspect.

FIGS. 11-15 illustrate various methodologies and/or apparatuses in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
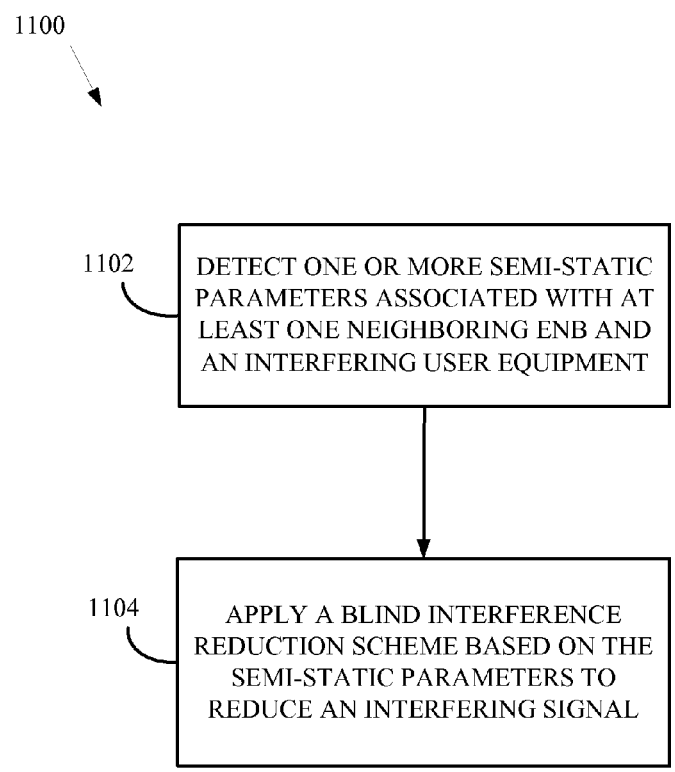
FIG. 11 is a flow chart of a method of wireless communication.

Referring to FIG. 11, a system 1100 which may include a UE, a first eNB and any suitable number of additional eNBs or UEs. Further, in operation the eNB may implement one or more blind interference decrease/cancellation schemes. More particularly, FIG. 11 is a flow diagram illustrating a "blind" interference decrease/cancellation scheme where a femto eNB may be without the knowledge of the payload size. At reference numeral 1102, an eNB may detect by one or more semi-static parameters associated with at least one neighboring eNB and an interfering UE.

In one aspect, the semi-static parameters may include, for example, an eNB cell ID, a network identifier of the interfering UE, or a resource ID of the interfering UE. In one aspect, a payload size or whether the interfering UE is sending a control CQI in a subframe may be unknown. In such an aspect, the one or more semi-static parameters which may be derived may include, but are not limited to: a root sequence detected using the eNB cell ID, a radio bearer location detected using the resource ID of the interfering UE, a cyclic shift index per localized frequency division multiplexing symbol detected using the eNB cell ID and the resource ID of the interfering UE, a scrambling sequence detected using the eNB cell ID and the network identifier of the interfering UE, etc.

In another aspect, the semi-static parameters may include, for example, eNB cell ID and a network identifier of the interfering UE. In one aspect, a payload size, a cyclic shift index per LFDM symbol or whether the interfering UE is sending a control CQI in a subframe may be unknown. In such an aspect, at least one of the following may be derived from the one or more semi-static parameters: a CGS root sequence, a common shift offsets for each LFDM symbol in a subframe detected by the serving eNB cell ID, a scrambling sequence is detected using the eNB cell ID and the network identifier of the interfering UE, etc.

In another aspect, the semi-static parameters may include, for example, eNB cell ID. In this aspect, a payload size, a cyclic shift index per localized frequency division multiplexing symbol, whether the interfering UE is sending a control CQI in a subframe or a scrambling sequence may be unknown. In this aspect, at least one of the following is derived from the one or more semi-static parameters: a CGS root sequence detected using the eNB cell ID, common shift offsets for each LFDM symbol in subframe detected by the serving eNB cell ID, etc.

At reference numeral 1104, an eNB may apply a blind interference reduction scheme based on the one or more detected semi-static parameters to reduce a signal from the interfering UE. Further discussion on various blind interference reduction schemes is provided with reference to FIGS. 13-15.

In one aspect, the eNB applying a blind interference reduction scheme may decide an interference reduction order of the at least one neighboring eNB. Thereafter, the eNB may decode a signal of the suspected interfering UE assuming a maximum payload size. Further, the UE may reconstruct a transmit signal of the suspected interfering UE to form a reconstructed signal, and then detect a DTX. In such an aspect, detecting a discontinuous transmission further include creating a residue signal by removing a reconstructed signal from a received signal, calculating an energy of a received signal and an energy of a residue signal; calculating the ratio of the received signal energy to the residue signal energy, comparing the ratio with a threshold, and declaring a discontinuous transmission if the ratio is above the threshold.

In another aspect, the eNB applying a blind interference reduction scheme may determine a resource ID of the interfering UE. The eNB may identify an interference reduction order of the at least one neighboring eNB. Further, the eNB may decode a signal from the interfering UE. Thereafter, the eNB may use the decoded signal to reconstruct transmit signal transmitted from the interfering UE, and detect a DTX. If there is a single interfering UE, then the eNB may set a maximum payload size equal to 11, and decode a signal from the interfering UE using the maximum payload size. If there is more than one interfering UE then the eNB may decode the signal of each interfering UE using a plurality of known scrambling codes, and select a decoded signal corresponding to the maximum number of correlations. In one aspect, the correlations may be determined during the decoding process.

In one aspect, the eNB may detect a DTX by creating a residue signal. In one aspect, the residue signal may be created by removing a reconstructed signal from a received signal. Thereafter, a DTX may be detected through calculation of the ratio of a received signal energy to a residue signal energy. In such an aspect, a DTX may be detected when the ratio is above the threshold.

In another aspect, the eNB applying a blind interference reduction scheme may identify an interference reduction order of the at least one neighboring eNB. The eNB may further decode a signal of a strong interfering UE using a LLR, and reconstruct a signal transmitted from the interfering UE using the LLR results. Thereafter, the eNB may detect a DTX from the decoded signal.

Figure 12:
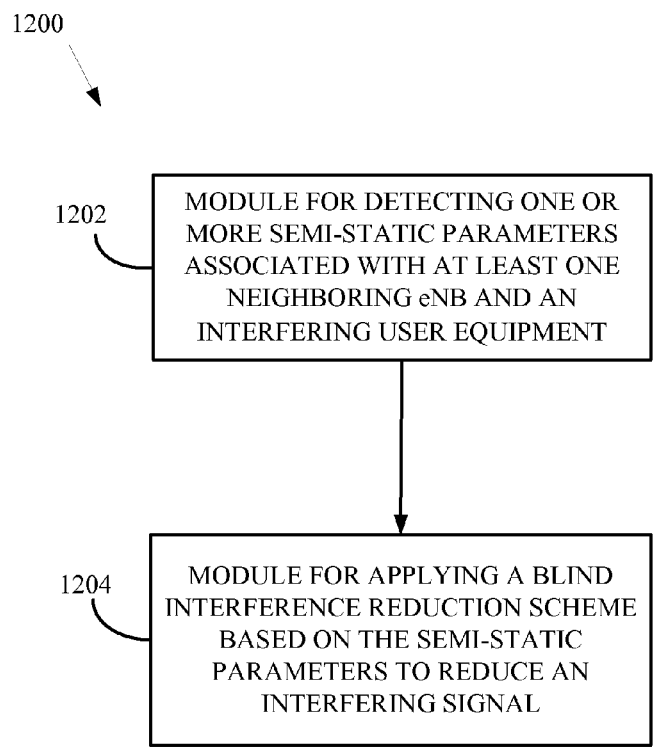
FIG. 12 is a conceptual block diagram illustrating the functionality of an exemplary apparatus.

FIG. 12 is a conceptual block diagram illustrating the functionality of an exemplary apparatus 1200. Referring to FIG. 12, a system 1200 which may include a UE, a first eNB and any suitable number of additional eNBs or UEs. Further, in operation in the system 1200, the eNB may implement blind interference decrease/cancellation techniques.

The apparatus 1200 includes a module 1202 that may detect by one or more semi-static parameters associated with at least one neighboring eNB and an interfering UE.

The apparatus 1200 includes a module 1204 that may apply a blind interference reduction scheme based on the one or more detected semi-static parameters to reduce a signal from the interfering UE.

Figure 13:
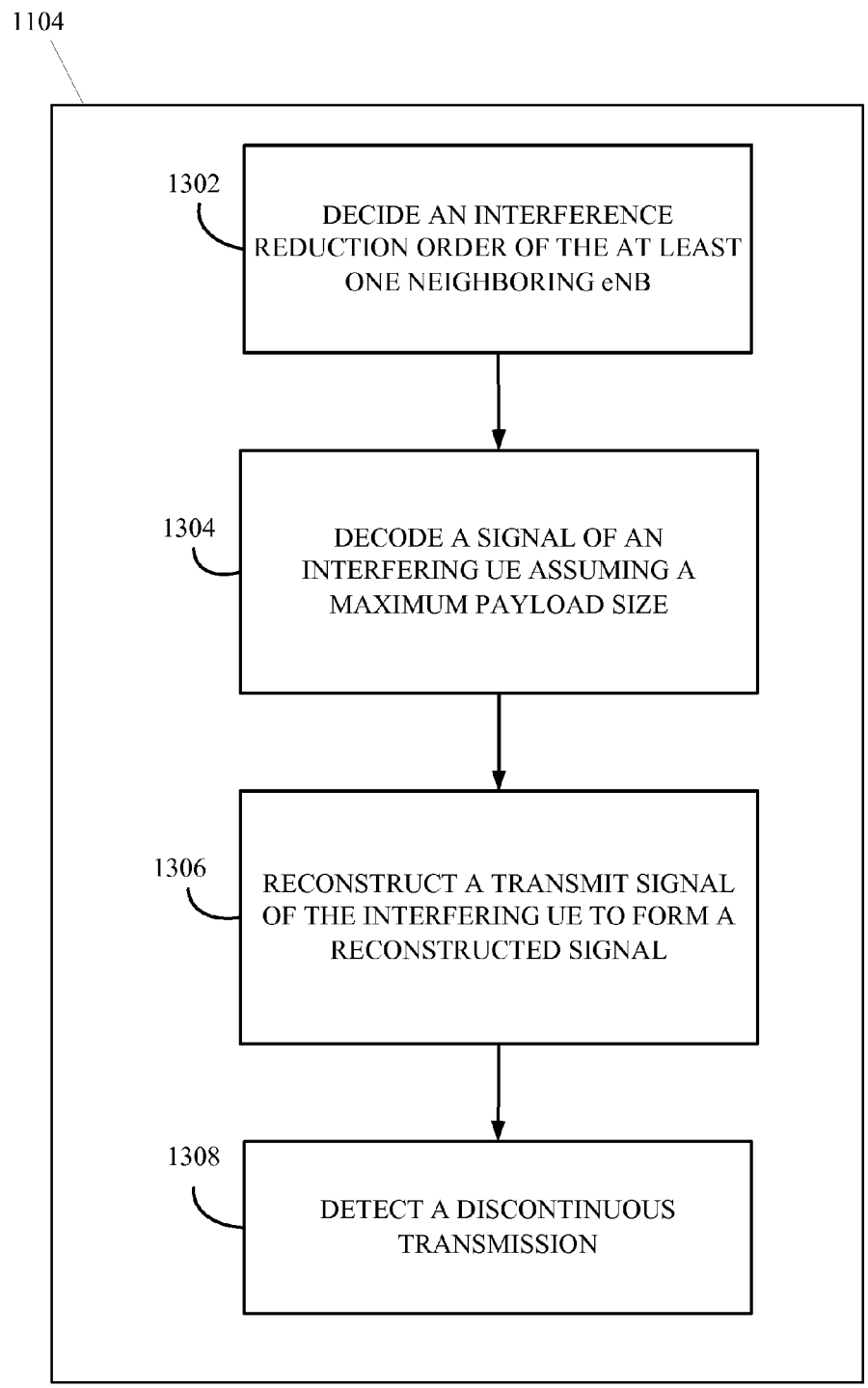
FIG. 13 is a flow chart of an implementation of a blind interference reduction scheme according to an aspect.

FIG. 13 is a flow diagram illustrating an exemplary blind interference reduction scheme, such as described with reference to reference numeral 1104 of FIG. 11. In the depicted aspect, semi-static parameters may include, for example, an eNB cell ID, a network identifier of the interfering UE or a resource ID of an interfering UE.

At reference numeral 1302, an eNB may decide an interference reduction order of various neighboring eNBs. In one aspect, the eNB may determine an IC order of signals intended for neighbor eNBs. In one aspect, blind interference reduction scheme module 1114 may generate an estimate of the average noise observed by the eNB for each neighbor eNB with a possible interfering UE. Such possible, or suspected, interfering UEs may, for example, send CQI in the same RB location. In one aspect, the average noise may be estimated by any number of calculations to generate an average noise value. For example, the noise signal may be filtered and a simple average of the signal may be generated.

At reference numeral 1304, an eNB may decode a signal of the interfering UE assuming a maximum payload size. In one aspect, any suitable payload size may be used. For example, a maximum payload size may be used in place of the actual, known payload size. Such a maximum payload size may, for example, correspond to a payload size of 11 bits. A payload size of 11 bits may, for example, correspond to the maximum payload size of CQI if a 20×13 block code is used to encode the information bits. Where a maximum payload size is assumed a signal may be decoded under that assumption. If the maximum payload size is correct and, therefore, the decoding is also correct, the last several bits should be 0s if the actual payload size is less than 11. This indication can be used, for example, to gauge the effectiveness of the assumed payload size, whether the assumed payload size is maximum or less than maximum, etc.

At reference numeral 1306, an eNB may reconstruct a transmit signal of the interfering UE to form a reconstructed signal. Any suitable reconstruction of the transmit signal of the interfering UE may be used. For example, the femto eNB may fully replicate the interference signal transmitted by an interfering UE, the femto eNB may represent portions of the signal of an interfering UE, etc.

At reference numeral 1308, an eNB may detect a discontinuous transmission. In one aspect, the energy of the Received Signal and the energy of the Interference Signal may be calculated. These energies may be calculated by any of a number of suitable methods known in the art. The Residue Signal may be removed from the Received Signal through, for example, signal subtraction techniques. Subsequently, a ratio between the Received Signal and the Interference Signal may be calculated and compared with a threshold value. If the calculated ratio between the Received Signal and the Interference Signal is below the threshold value, this may be taken as an indication that the interference level is minor. In such an aspect, DTX may be declared, and cancellation may not be performed. Otherwise, the Interference Signal may be removed from the Received Signal through, for example, signal subtraction techniques.

Figure 14:
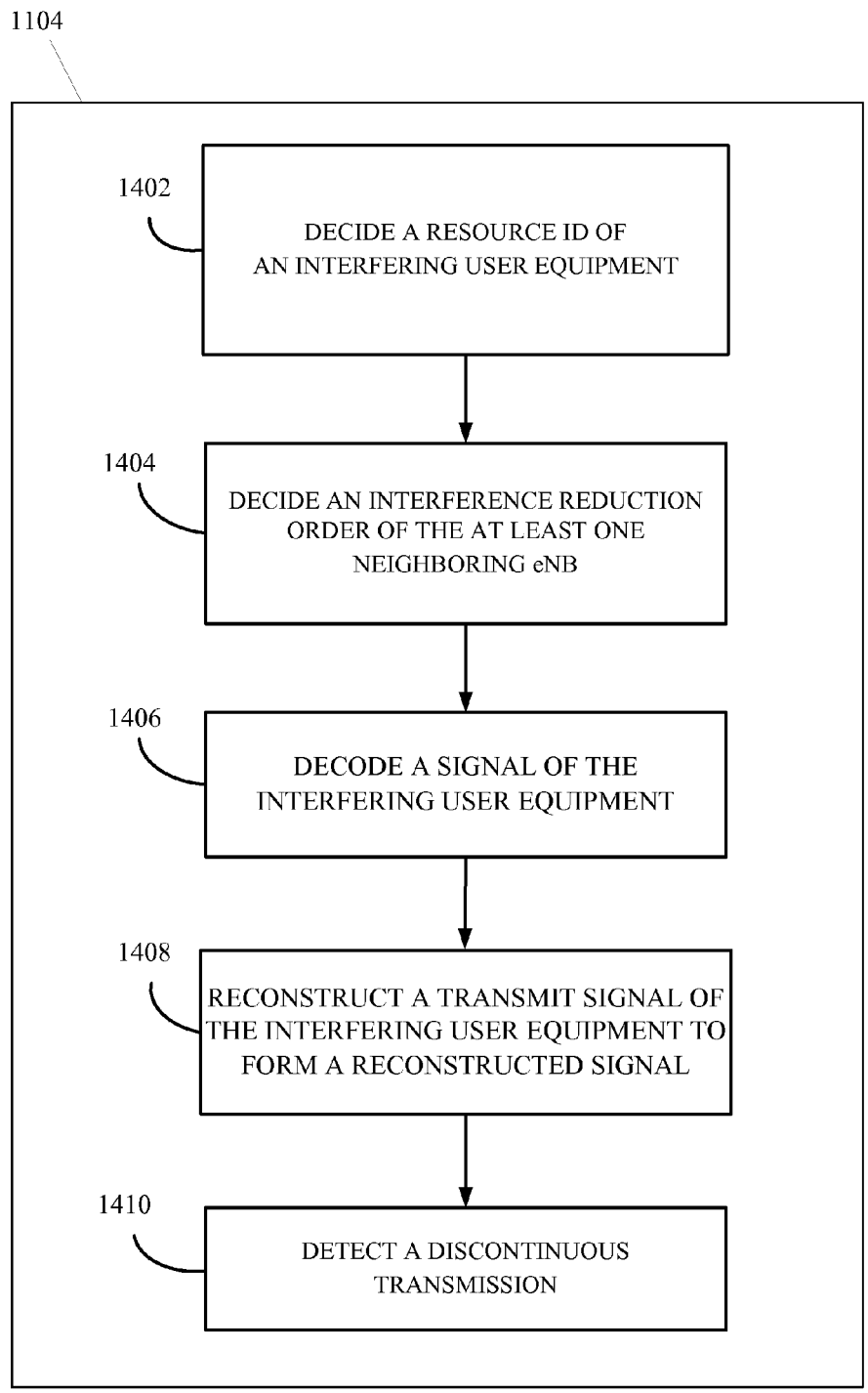
FIG. 14 is a flow chart of another implementation of a blind interference reduction scheme according to an aspect.

FIG. 14 is a flow diagram illustrating another exemplary blind interference reduction scheme, such as described with reference to reference numeral 1104 of FIG. 11. In the depicted aspect, semi-static parameters may include, for example, an eNB cell ID, an eNB cell ID and a network identifier of the interfering UE.

At reference numeral 1402, an eNB may determine a resource ID of the interfering UE. For example, the eNB may determine the resource ID by estimating the average noise the eNB could observe from an interfering UE assuming the UE is using a particular cyclic shift index. In one of aspect, the eNB may process a subset of possible cyclic shift indices. Additionally or in the alternative, each possible cyclic index may be tried so that average noise generated by an interfering UE for each of the possible cyclic shift indices is estimated. Next the estimated noise for each of the determined possibilities may be ordered into an increasing or decreasing sequence according to their noise estimates. In one aspect, the smallest noise estimates, according to the number of strong interfering UEs for the eNB, may then be retained for further consideration. The cyclic shift indexes corresponding to these smallest noise estimates may be considered as those used by the interfering UEs.

At reference numeral 1404, an eNB may identify an interference reduction order of one or more neighboring eNBs. For example, the eNB may estimate the average noise that is received from each of the neighboring eNBs with possible interfering UEs which may send CQI in the same RB location. From these estimates, the eNB may then produce a list of neighbor eNBs according to the estimated noise from small to large. The list may be used to identify the order of the interference decrease/cancellation of each neighbor eNB.

At reference numeral 1406, an eNB may decode a signal of the interfering UE. In one aspect, the decoding may include determining if there are one or more interfering UEs. This decoding may proceed in at least two different ways according to the number of interfering UEs. If there is a single interfering UE, the signal of that UE could be decoded assuming a payload size is 11 (as described above), especially in a case in which the scrambling code for the interfering UE is known. Alternatively, if there is more than one interfering UE, the eNB may try a subset of each possible known scrambling code and use each of the scrambling codes to decode the signal. The eNB may also use all known scrambling codes to decode the signal. Once the signal has been decoded, the eNB may use correlations calculated during the decoding process to pick an appropriate scrambling code based on a finding of a correlation and use the scrambling code in the decoding process. During this procedure, the eNB may, for example, assume the payload size is 11, or may assume another appropriate payload size.

At reference numeral 1408, an eNB may reconstruct a transmit signal of the interfering UE to form a reconstructed signal.

At reference numeral 1410, an eNB may detect a discontinuous transmission. In one aspect, the eNB may detect a DTX by creating a residue signal. In one aspect, the residue signal may be created by removing a reconstructed signal from a received signal. Thereafter, a DTX may be detected through calculation of the ratio of a received signal energy to a residue signal energy. In such an aspect, a DTX may be detected when the ratio is above the threshold.

Figure 15:
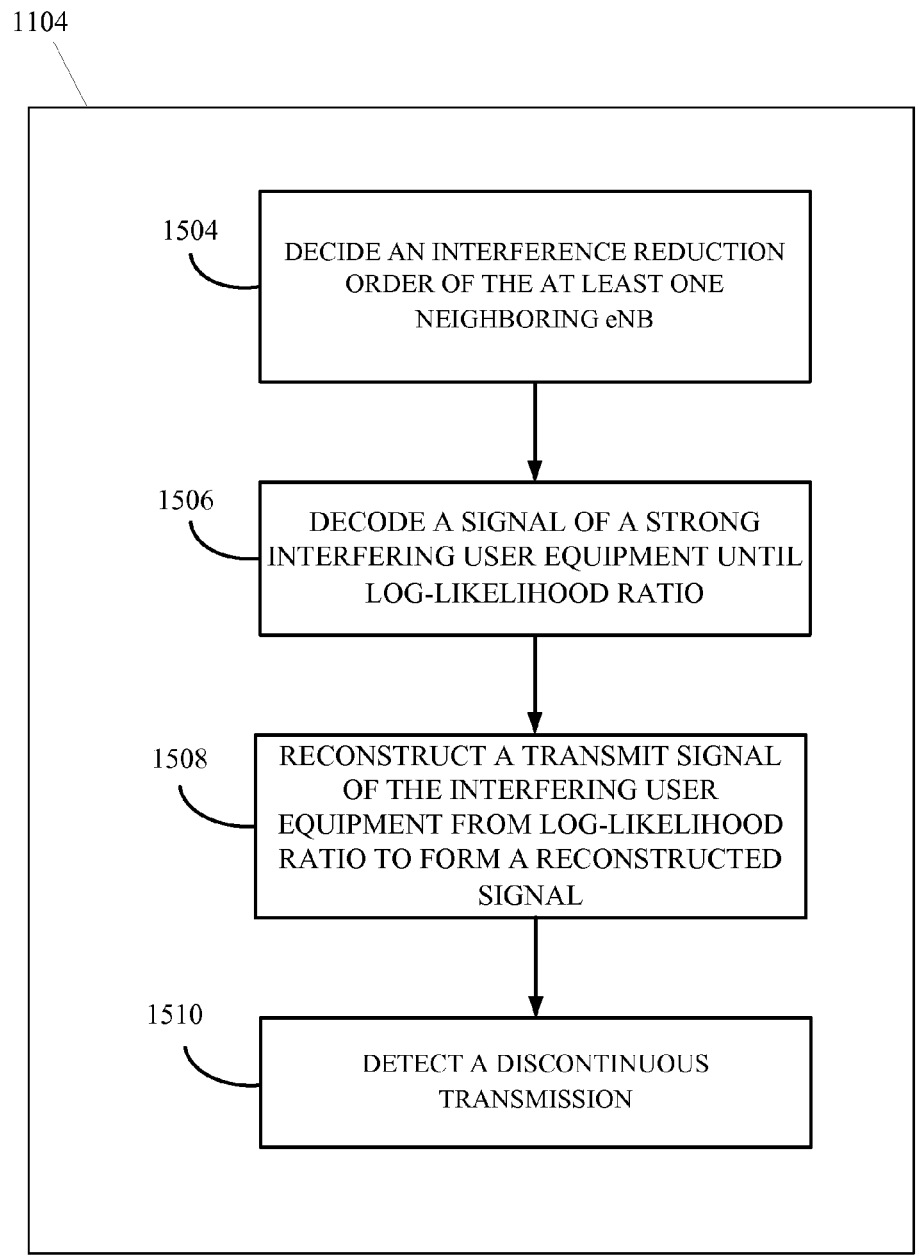
FIG. 15 is a flow chart of yet another implementation of a blind interference reduction scheme according to an aspect.

FIG. 15 is a flow diagram illustrating another exemplary blind interference reduction scheme, such as described with reference to reference numeral 1104 of FIG. 11. In the depicted aspect, the semi-static parameters may include, for example, an eNB cell ID.

At reference numeral 1504, an eNB may identify an interference reduction order of the at least one neighboring eNB. In one aspect, the eNB may estimate an average noise a neighboring eNB could observe from a possible interfering UE that may send a control CQI in a radio bearer as the neighboring eNB, and create an order of the blind interference reduction by ordering the neighbor eNB according to the estimated noise.

At reference numeral 1506, an eNB may decode a signal of a strongly interfering UE using LLR.

At reference numeral 1508, an eNB may reconstruct a transmit signal of the interfering UE from signal decoded using LLR to form a reconstructed signal. The eNB may further decode a signal of a strong interfering UE using a LLR, and reconstruct a signal transmitted from the interfering UE using the LLR results. Thereafter, the eNB may detect a DTX from the decoded signal.

At reference numeral 1510, an eNB may detect a discontinuous transmission. In one aspect, detecting a discontinuous transmission may include creating a residue signal by removing a reconstructed signal from a received signal, calculating an energy of a received signal and an energy of a residue signal, calculating the ratio of the received signal energy to the residue signal energy, comparing the ratio with a threshold, and declaring a discontinuous transmission if the ratio is above the threshold.

Referring to FIG. 1 and FIG. 7, in one configuration, the apparatus 100 for wireless communication includes means for detecting, at an eNB, one or more semi-static parameters associated with at least one neighboring eNB and an interfering UE, and means for reducing signal interference from a signal generated by the interfering UE by applying a blind interference reduction scheme based on the one or more detected semi-static parameters. In another configuration the apparatus 100 may include means for identifying an interference reduction order of the at least one neighboring eNB, means for decoding a received signal from the interfering UE assuming a maximum payload size, means for reconstructing a transmit signal of the interfering UE from the decoded signal, and means for detecting a discontinuous transmission in the reconstructed transmit signal. In another configuration the apparatus 100 may include means for estimating an average noise a neighboring eNB observes from the interfering UE, and means for creating an order of the blind interference reduction by ordering the neighbor eNB according to the estimated average noise. In another configuration the apparatus 100 may include means for setting the maximum payload size equal to 11. In another configuration the apparatus 100 may include means for creating a residue signal by removing the reconstructed signal from the received signal, means for calculating an energy of the received signal and an energy of the residue signal, means for calculating the ratio of the received signal energy to the residue signal energy, means for comparing the ratio with a threshold, and means for declaring a discontinuous transmission if the ratio is above the threshold. In another configuration the apparatus 100 may include means for identifying an interference reduction order of the at least one neighboring eNB, means for decoding a signal from the interfering UE, means for reconstructing a transmit signal of the interfering UE, and means for detecting a discontinuous transmission from the reconstructed signal. In another configuration the apparatus 100 may include means for estimating an average noise for the interfering UE from a plurality of possible cyclic shift indices, means for ordering the noise estimates according to their noise levels, and means for assigning to the interfering UE a cyclic shift index that represents the lowest noise level estimate. In another configuration the apparatus 100 may include means for determining if there are one or more interfering UEs. In such an aspect, if there is a single interfering UE, then the apparatus 100 may include means for setting the maximum payload size equal to 11, and means for decoding a signal from the interfering UE using the maximum payload size. By contrast, in such an aspect, if there is more than one interfering UE, then the apparatus 100 may include means for decoding the signal of each interfering UE using a plurality of known scrambling codes, means for calculating correlations during the decoding, and means for selecting the decoded signal corresponding to the maximum number of correlations. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
reducing signal interference from a signal generated by the interfering UE, at the eNB, by applying a blind interference reduction scheme based on the one or more semi-static parameters.

2. The method of claim 1, wherein the one or more semi-static parameters includes one or more of:
an eNB cell ID;
a network identifier of the interfering UE;
a resource ID of the interfering UE; or
a combination thereof.

3. The method of claim 2, wherein one or more of the following is unknown:
a payload size;
whether the interfering UE is sending a control channel quality indicator (CQI) in a subframe; or
a combination thereof.

4. The method of claim 2, wherein one or more of the following is derived from the one or more semi-static parameters:
a root sequence detected using the eNB cell ID;
a radio bearer location detected using the resource ID of the interfering UE;
a cyclic shift index per localized frequency division multiplexing symbol detected using the eNB cell ID and the resource ID of the interfering UE;
a scrambling sequence detected using the eNB cell ID and the network identifier of the interfering UE; or
a combination thereof.

5. The method of claim 1, wherein the one or more semi-static parameters comprise an eNB cell ID and a network identifier of the interfering UE.

6. The method of claim 5, wherein one or more of the following is unknown:
a payload size;
a cyclic shift index per localized frequency division multiplexing symbol;
whether the interfering UE is sending a control CQI in a subframe; or
a combination thereof.

7. The method of claim 5, wherein one or more of the following is derived from the one or more semi-static parameters:
a root sequence is detected using the eNB cell ID;
common shift offsets for each localized frequency division multiplexing symbol in subframe detected by the eNB cell ID;
a scrambling sequence detected using the eNB cell ID and the network identifier of the interfering UE; or
a combination thereof.

8. The method of claim 1, wherein the one or more semi-static parameters includes an eNB cell ID.

9. The method of claim 8, wherein one or more of the following is unknown:
a payload size;
a cyclic shift index per localized frequency division multiplexing symbol;
whether the interfering UE is sending a control CQI in a subframe;
a scrambling sequence; or
a combination thereof.

10. The method of claim 8, wherein at least one of the following is derived from the one or more semi-static parameters:
a root sequence detected using the eNB cell ID; or
common shift offsets for each localized frequency division multiplexing symbol in subframe detected by the eNB cell ID.

11. A method of wireless communication, comprising:
obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
reducing signal interference from a signal generated by the interfering UE, at the eNB, by applying a blind interference reduction scheme based on the one or more semi-static parameters, wherein applying the blind interference reduction scheme further comprises:
identifying an interference reduction order of the at least one neighboring eNB;
processing the at least one neighboring eNB in accordance with the interference reduction order by:
decoding a received signal from the interfering UE assuming a maximum payload size;
reconstructing a transmit signal of the interfering UE from the decoded signal; and
detecting a discontinuous transmission in the reconstructed transmit signal.

12. The method of claim 11, wherein the identifying an interference reduction order of the at least one neighboring eNB further comprises:
estimating an average noise a neighboring eNB observes from the interfering UE; and
creating an order of the blind interference reduction scheme by ordering the at least one neighboring eNB according to the estimated average noise.

13. The method of claim 11, wherein the detecting a discontinuous transmission further comprises:
creating a residue signal by removing the reconstructed transmit signal from the received signal;
calculating an energy of the received signal and an energy of the residue signal;
calculating a ratio of the received signal energy to the residue signal energy;
comparing the ratio with a threshold; and
declaring a discontinuous transmission if the ratio is above the threshold.

14. A method of wireless communication, comprising:
obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
reducing signal interference from a signal generated by the interfering UE, at the eNB, by applying a blind interference reduction scheme based on the one or more semi-static parameters, wherein the one or more semi-static parameters comprise an eNB cell ID and a network identifier of the interfering UE and applying the blind interference reduction scheme further comprises:
  determining a resource ID of the interfering UE;
  identifying an interference reduction order of the at least one neighboring eNB;
  decoding a signal from the interfering UE;
  reconstructing a transmit signal of the interfering UE; and
  detecting a discontinuous transmission from the reconstructed signal.

15. The method of claim 14, wherein the determining a resource ID of the interfering UE further comprises:
  estimating an average noise for the interfering UE for each of a plurality of possible cyclic shift indices;
  ordering the noise estimates according to their noise levels; and
  assigning to the interfering UE a cyclic shift index that represents the lowest noise level estimate.

16. The method of claim 14, wherein the decoding a signal from the interfering UE further comprises:
  determining if there are one or more interfering UEs;
  if there is a single interfering UE:
    setting the maximum payload size equal to a predetermined number; and
    decoding a signal from the interfering UE using the maximum payload size; or
  if there is more than one interfering UE;
    decoding the signal of each interfering UE using a plurality of known scrambling codes;
    calculating correlations during the decoding; and
    selecting the decoded signal corresponding to the maximum number of correlations.

17. A method of wireless communication, comprising:
  obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
  reducing signal interference from a signal generated by the interfering UE, at the eNB, by applying a blind interference reduction scheme based on the one or more semi-static parameters, wherein the one or more semi-static parameters includes an eNB cell ID and applying a blind interference reduction scheme further comprises:
    identifying an interference reduction order of the at least one neighboring eNB;
    decoding a signal of an interfering UE using a log-likelihood ratio;
    reconstructing a transmit signal of the interfering UE from the decoded signal to form a reconstructed signal; and
    detecting a discontinuous transmission from the reconstructed signal.

18. A method of wireless communication, comprising:
  obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
  reducing signal interference from a signal generated by the interfering UE, at the eNB, by applying a blind interference reduction scheme based on the one or more semi-static parameters, wherein obtaining the one or more semi-static parameters comprises at least one of:
    detecting the one or more semi-static parameters, the detecting including monitoring network signaling associated with the at least one neighboring eNB and the interfering user equipment (UE);
    receiving the one or more semi-static parameters via a backhaul; or
    receiving the one or more semi-static parameters via a report from a UE associated with the eNB.

19. An apparatus for wireless communication, comprising:
  means for obtaining, at an eNodeB (eNB), one or more semi-static parameters identifying the at least one neighboring eNB and an interfering user equipment UE, the at least one neighboring eNB and the interfering UE being located in a cell that is next to or overlapping with a cell of the eNB; and
  means for reducing signal interference from a signal generated by the interfering UE, at the eNB, by applying a blind interference reduction scheme based on the one or more semi-static parameters.

20. The apparatus of claim 19, wherein the one or more semi-static parameters includes one or more of:
  an eNB cell ID, a network identifier of the interfering UE;
  a resource ID of the interfering UE; or
  a combination thereof.

21. The apparatus of claim 20, wherein one or more of the following is unknown:
  a payload size;
  whether the interfering UE is sending a control CQI in a subframe; or
  a combination thereof.

22. The apparatus of claim 20, wherein one or more of the following is derived from the one or more semi-static parameters:
  a root sequence detected using the eNB cell ID;
  a radio bearer location detected using the resource ID of the interfering UE;
  a cyclic shift index per localized frequency division multiplexing symbol detected using the eNB cell ID and the resource ID of the interfering UE;
  a scrambling sequence detected using the eNB cell ID and the network identifier of the interfering UE; or
  a combination thereof.

23. The apparatus of claim 19, wherein the one or more semi-static parameters comprise an eNB cell ID and a network identifier of the interfering UE.

24. The apparatus of claim 23, wherein one or more of the following is unknown:
  a payload size;
  a cyclic shift index per localized frequency division multiplexing symbol;
  whether the interfering UE is sending a control CQI in a subframe;
  a scrambling sequence; or
  a combination thereof.

25. The apparatus of claim 23, wherein one or more of the following is derived from the one or more semi-static parameters:
  a root sequence is detected using the eNB cell ID;
  common shift offsets for each localized frequency division multiplexing symbol in subframe detected by the eNB cell ID;
  a scrambling sequence detected using the eNB cell ID and the network identifier of the interfering UE; or
  a combination thereof.

26. The apparatus of claim 19, wherein the one or more semi-static parameters includes an eNB cell ID.

27. The apparatus of claim 26, wherein one or more of the following is unknown:
   a payload size;
   a cyclic shift index per localized frequency division multiplexing symbol;
   whether the interfering UE is sending a control CQI in a subframe; or
   a scrambling sequence;
   a combination thereof.

28. The apparatus of claim 26, wherein one or more of the following is derived from the one or more semi-static parameters:
   a root sequence detected using the eNB cell ID;
   common shift offsets for each localized frequency division multiplexing symbol in subframe detected by the eNB cell ID; or
   a combination thereof.

29. An apparatus for wireless communication, comprising:
   means for obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
   means for reducing signal interference from a signal generated by the interfering UE, at the eNB, by applying a blind interference reduction scheme based on the one or more semi-static parameters, wherein the means for reducing signal interference from a signal generated by the interfering UE by applying a blind interference reduction scheme, further comprises:
      means for identifying an interference reduction order of the at least one neighboring eNB;
      means for processing the at least one neighboring eNB in accordance with the interference reduction order including:
         means for decoding a received signal from the interfering UE assuming a maximum payload size;
         means for reconstructing a transmit signal of the interfering UE from the decoded signal; and
         means for detecting a discontinuous transmission in the reconstructed transmit signal.

30. The apparatus of claim 29, wherein the means for identifying an interference reduction order of the at least one neighboring eNB further comprises:
   means for estimating an average noise a neighboring eNB observes from the interfering UE; and
   means for creating an order of the blind interference reduction by ordering the neighbor eNB according to the estimated average noise.

31. The apparatus of claim 29, wherein the means for detecting a discontinuous transmission further comprises:
   means for creating a residue signal by removing the reconstructed transmit signal from the received signal;
   means for calculating an energy of the received signal and an energy of the residue signal;
   means for calculating a ratio of the received signal energy to the residue signal energy;
   means for comparing the ratio with a threshold; and
   means for declaring a discontinuous transmission if the ratio is above the threshold.

32. An apparatus for wireless communication, comprising:
   means for obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
   means for reducing signal interference from a signal generated by the interfering UE, at the eNB, by applying a blind interference reduction scheme based on the one or more semi-static parameters, wherein the one or more semi-static parameters comprise an eNB cell ID and a network identifier of the interfering UE and the means for reducing signal interference from a signal generated by the interfering UE by applying a blind interference reduction scheme further comprises:
      means for determining a resource ID of the interfering UE;
      means for identifying an interference reduction order of the at least one neighboring eNB;
      means for decoding a signal from the interfering UE;
      means for reconstructing a transmit signal of the interfering UE; and
      means for detecting a discontinuous transmission from the reconstructed signal.

33. The apparatus of claim 32, wherein the means for determining a resource ID of the interfering UE further comprises:
   means for estimating an average noise for the interfering UE for each of a plurality of possible cyclic shift indices;
   means for ordering the noise estimates according to their noise levels; and
   means for assigning to the interfering UE a cyclic shift index that represents the lowest noise level estimate.

34. The apparatus of claim 32, wherein the means for decoding a signal from the interfering UE further comprises:
   means for determining if there are one or more interfering UEs;
   if there is a single interfering UE:
      means for setting the maximum payload size equal to a predetermined number; and
      means for decoding a signal from the interfering UE using the maximum payload size; or
   if there is more than one interfering UE;
      means for decoding the signal of each interfering UE using a plurality of known scrambling codes;
      means for calculating correlations during the decoding; and
      means for selecting the decoded signal corresponding to the maximum number of correlations.

35. An apparatus for wireless communication, comprising:
   means for obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
   means for reducing signal interference from a signal generated by the interfering UE, at the eNB, by applying a blind interference reduction scheme based on the one or more semi-static parameters, wherein the one or more semi-static parameters includes an eNB cell ID and the means for reducing signal interference from a signal generated by the interfering UE by applying a blind interference reduction scheme further comprises:
      means for identifying an interference reduction order of the at least one neighboring eNB;
      means for decoding a signal of an interfering UE using a log-likelihood ratio;

means for reconstructing a transmit signal of the interfering UE from the decoded signal to form a reconstructed signal; and
means for detecting a discontinuous transmission from the reconstructed signal.

36. An apparatus for wireless communication, comprising:
means for obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
means for reducing signal interference from a signal generated by the interfering UE, at the eNB, by applying a blind interference reduction scheme based on the one or more semi-static parameters, wherein the means for obtaining the one or more semi-static parameters at least one of:
detects the one or more semi-static parameters, the detecting including monitoring network signaling associated with the at least one neighboring eNB and the interfering UE;
receives the one or more semi-static parameters via a backhaul; or
receives the one or more semi-static parameters via a report from a UE associated with the eNB.

37. A computer program product, comprising:
a non-transitory computer-readable medium comprising code for:
obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
reducing signal interference from a signal generated by the interfering UE, at the eNB, by applying a blind interference reduction scheme based on the one or more semi-static parameters.

38. The computer program product of claim 37, wherein the one or more semi-static parameters includes one or more of:
an eNB cell ID;
a network identifier of the interfering UE;
a resource ID of the interfering UE; or
a combination thereof.

39. The computer program product of claim 38, wherein one or more of the following is unknown:
a payload size;
whether the interfering UE is sending a control CQI in a subframe; or
a combination thereof.

40. The computer program product of claim 38, wherein one or more of the following is derived from the one or more semi-static parameters:
a root sequence detected using the eNB cell ID;
a radio bearer location detected using the resource ID of the interfering UE;
a cyclic shift index per localized frequency division multiplexing symbol detected using the eNB cell ID and the resource ID of the interfering UE;
a scrambling sequence detected using the eNB cell ID and the network identifier of the interfering UE; or
a combination thereof.

41. The computer program product of claim 37, wherein the one or more semi-static parameters comprise an eNB cell ID and a network identifier of the interfering UE.

42. The computer program product of claim 41, wherein one or more of the following is unknown:
a payload size;
a cyclic shift index per localized frequency division multiplexing symbol;
whether the interfering UE is sending a control CQI in a subframe; or
a combination thereof.

43. The computer program product of claim 41, wherein one or more of the following is derived from the one or more semi-static parameters:
a root sequence is detected using the eNB cell ID;
common shift offsets for each localized frequency division multiplexing symbol in subframe detected by the eNB cell ID;
a scrambling sequence detected using the eNB cell ID and the network identifier of the interfering UE; or
a combination thereof.

44. The computer program product of claim 37, wherein the one or more semi-static parameters includes an eNB cell ID.

45. The computer program product of claim 44, wherein one or more of the following is unknown:
a payload size;
a cyclic shift index per localized frequency division multiplexing symbol;
whether the interfering UE is sending a control CQI in a subframe;
a scrambling sequence; or
a combination thereof.

46. The computer program product of claim 44, wherein one or more of the following is derived from the one or more semi-static parameters:
a root sequence detected using the eNB cell ID;
common shift offsets for each localized frequency division multiplexing symbol in subframe detected by the eNB cell ID; or
a combination thereof.

47. A computer program product, comprising:
a non-transitory computer-readable medium comprising code for:
obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
reducing signal interference from a signal generated by the interfering UE, at the eNB, by applying a blind interference reduction scheme based on the one or more semi-static parameters,
wherein the code for reducing signal interference applies the blind interference reduction scheme using code for:
identifying an interference reduction order of the at least one neighboring eNB;
processing the at least one neighboring eNB in accordance with the interference reduction order by:
decoding a received signal from the interfering UE assuming a maximum payload size;
reconstructing a transmit signal of the interfering UE from the decoded signal; and
detecting a discontinuous transmission in the reconstructed transmit signal.

48. The computer program product of claim 47, wherein the code for identifying an interference reduction order of the at least one neighboring eNB further comprises code for:

estimating an average noise a neighboring eNB observes from the interfering UE; and creating an order of the blind interference reduction by ordering the neighbor eNB according to the estimated average noise.

49. The computer program product of claim 47, wherein the code for detecting a discontinuous transmission further comprises code for:

creating a residue signal by removing the reconstructed transmit signal from the received signal;

calculating an energy of the received signal and an energy of the residue signal;

calculating a ratio of the received signal energy to the residue signal energy;

comparing the ratio with a threshold; and declaring a discontinuous transmission if the ratio is above the threshold.

50. A computer program product, comprising:

a non-transitory computer-readable medium comprising code for:

obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and reducing signal interference from a signal generated by the interfering UE, at the eNB, by applying a blind interference reduction scheme based on the one or more semi-static parameters, wherein the one or more semi-static parameters comprise an eNB cell ID and a network identifier of the interfering UE and the code for reducing signal interference applies the blind interference reduction scheme using code for:

determining a resource ID of the interfering UE;

identifying an interference reduction order of the at least one neighboring eNB;

decoding a signal from the interfering UE;

reconstructing a transmit signal of the interfering UE; and detecting a discontinuous transmission from the reconstructed signal.

51. The computer program product of claim 50, wherein the code for determining a resource ID of the interfering UE further comprises code for:

estimating an average noise for the interfering UE for each of a plurality of possible cyclic shift indices;

ordering the noise estimates according to their noise levels; and assigning to the interfering UE a cyclic shift index that represents the lowest noise level estimate.

52. The computer program product of claim 50, wherein the code for decoding a signal from the interfering UE further comprises code for:

determining if there are one or more interfering UEs;

if there is a single interfering UE:

setting the maximum payload size equal to a predetermined number; and decoding a signal from the interfering UE using the maximum payload size; or if there is more than one interfering UE:

decoding the signal of each interfering UE using a plurality of known scrambling codes;

calculating correlations during the decoding; and selecting the decoded signal corresponding to the maximum number of correlations.

53. A computer program product, comprising:

a non-transitory computer-readable medium comprising code for:

obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and reducing signal interference from a signal generated by the interfering UE, at the eNB, by applying a blind interference reduction scheme based on the one or more semi-static parameters, wherein the one or more semi-static parameters includes an eNB cell ID and the code for reducing signal interference applies a blind interference reduction scheme using code for:

identifying an interference reduction order of the at least one neighboring eNB;

decoding a signal of an interfering UE using a log-likelihood ratio;

reconstructing a transmit signal of the interfering UE from the decoded signal to form a reconstructed signal; and detecting a discontinuous transmission from the reconstructed signal.

54. A computer program product, comprising:

a non-transitory computer-readable medium comprising code for:

obtaining, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and reducing signal interference from a signal generated by the interfering UE, at the eNB, by applying a blind interference reduction scheme based on the one or more semi-static parameters, wherein the code for obtaining the one or more semi-static parameters comprises at least one of:

code for detecting the one or more semi-static parameters, the detecting including monitoring network signaling associated with the at least one neighboring eNB and the interfering UE;

code for receiving the one or more semi-static parameters via a backhaul; or code for receiving the one or more semi-static parameters via a report from a UE associated with the eNB.

55. An apparatus for wireless communication, comprising:

at least one processor; and a memory coupled to the at least one processor, wherein the at least one processor is configured to:

obtain, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and apply, at the eNB, a blind interference reduction scheme based on the one or more semi-static parameters to reduce a signal from the interfering UE.

56. The apparatus of claim 55, wherein the one or more semi-static parameters includes one or more of:

an eNB cell ID, a network identifier of the interfering UE;

a resource ID of the interfering UE; or a combination thereof.

57. The apparatus of claim 56, wherein one or more of the following is unknown:
a payload size;
whether the interfering UE is sending a control CQI in a subframe; or
a combination thereof.

58. The apparatus of claim 56, wherein one or more of the following is derived from the one or more semi-static parameters:
a root sequence detected using the eNB cell ID;
a radio bearer location detected using the resource ID of the interfering UE;
a cyclic shift index per localized frequency division multiplexing symbol detected using the eNB cell ID and the resource ID of the interfering UE;
a scrambling sequence detected using the eNB cell ID and the network identifier of the interfering UE; or
a combination thereof.

59. The apparatus of claim 55, wherein the one or more semi-static parameters includes an eNB cell ID and a network identifier of the interfering UE.

60. The apparatus of claim 59, wherein one or more of the following is unknown:
a payload size;
a cyclic shift index per localized frequency division multiplexing symbol;
whether the interfering UE is sending a control CQI in a subframe; or
a combination thereof.

61. The apparatus of claim 59, wherein one or more of the following is derived from the one or more semi-static parameters:
a root sequence is detected using the eNB cell ID;
common shift offsets for each localized frequency division multiplexing symbol in subframe detected by the eNB cell ID;
a scrambling sequence detected using the eNB cell ID and the network identifier of the interfering UE; or
a combination thereof.

62. The apparatus of claim 55, wherein the one or more semi-static parameters includes an eNB cell ID.

63. The apparatus of claim 62, wherein one or more of the following is unknown:
a payload size;
a cyclic shift index per localized frequency division multiplexing symbol;
whether the interfering UE is sending a control CQI in a subframe;
a scrambling sequence; or
a combination thereof.

64. The apparatus of claim 62, wherein one or more of the following is derived from the one or more semi-static parameters:
a root sequence detected using the eNB cell ID;
common shift offsets for each localized frequency division multiplexing symbol in subframe detected by the eNB cell ID; or
a combination thereof.

65. An apparatus for wireless communication, comprising:
at least one processor; and
a memory coupled to the at least one processor, wherein the at least one processor is configured to:
obtain, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
apply, at the eNB, a blind interference reduction scheme based on the one or more semi-static parameters to reduce a signal from the interfering UE, wherein to apply a blind interference reduction scheme, the at least one processor is configured to:
identify an interference reduction order of the at least one neighboring eNB;
process the at least one neighboring eNB in accordance with the interference reduction order by being configured to:
decode a received signal from the interfering UE assuming a maximum payload size;
reconstruct a transmit signal of the interfering UE from the decoded signal; and
detect a discontinuous transmission in the reconstructed transmit signal.

66. The apparatus of claim 65, wherein to identify the interference reduction order of the at least one neighboring eNB, the at least one processor is configured to:
estimate an average noise a neighboring eNB observes from the interfering UE; and
create an order of the blind interference reduction by ordering the neighbor eNB according to the estimated average noise.

67. The apparatus of claim 65, wherein to detect a discontinuous transmission in the reconstructed transmit signal, the at least one processor is configured to:
create a residue signal by removing the reconstructed transmit signal from the received signal;
calculate an energy of the received signal and an energy of the residue signal;
calculate a ratio of the received signal energy to the residue signal energy;
compare the ratio with a threshold; and
declare a discontinuous transmission if the ratio is above the threshold.

68. An apparatus for wireless communication, comprising:
at least one processor; and
a memory coupled to the at least one processor, wherein the at least one processor is configured to:
obtain, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
apply, at the eNB, a blind interference reduction scheme based on the one or more semi-static parameters to reduce a signal from the interfering UE, wherein the one or more semi-static parameters includes an eNB cell ID and a network identifier of the interfering UE and to apply a blind interference reduction scheme, the at least one processor is configured to:
determine a resource ID of the interfering UE;
identify an interference reduction order of the at least one neighboring eNB;
decode a signal from the interfering UE;
reconstruct a transmit signal of the interfering UE; and
detect a discontinuous transmission from the reconstructed signal.

69. The apparatus of claim 68, wherein to determine a resource ID of the interfering UE, the at least one processor is configured to:

estimate an average noise for the interfering UE for each of a plurality of possible cyclic shift indices;
order the noise estimates according to their noise levels; and
assign to the interfering UE a cyclic shift index that represents the lowest noise level estimate.

70. The apparatus of claim 68, wherein to decode a signal from the interfering UE, the at least one processor is configured to:
determine if there are one or more interfering UEs;
if there is a single interfering UE:
set the maximum payload size equal to a predetermined number; and
decode a signal from the interfering UE using the maximum payload size; or
if there is more than one interfering UE;
decode the signal of each interfering UE using a plurality of known scrambling codes;
calculate correlations during the decoding; and
select the decoded signal corresponding to the maximum number of correlations.

71. An apparatus for wireless communication, comprising:
at least one processor; and
a memory coupled to the at least one processor, wherein the at least one processor is configured to:
obtain, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
apply, at the eNB, a blind interference reduction scheme based on the one or more semi-static parameters to reduce a signal from the interfering UE, wherein the one or more semi-static parameters includes an eNB cell ID and to apply a blind interference reduction scheme, the at least one processor is configured to:
identify an interference reduction order of the at least one neighboring eNB;
decode a signal of an interfering UE using a log-likelihood ratio;
reconstruct a transmit signal of the interfering UE from the decoded signal to form a reconstructed signal; and
detect a discontinuous transmission from the reconstructed signal.

72. An apparatus for wireless communication, comprising:
at least one processor; and
a memory coupled to the at least one processor, wherein the at least one processor is configured to:
obtain, at an eNodeB (eNB), one or more semi-static parameters identifying at least one neighboring eNB and an interfering user equipment (UE), the at least one neighboring eNB and the interfering UE being located in a cell that is next to or overlapping with a cell of the eNB; and
apply, at the eNB, a blind interference reduction scheme based on the one or more semi-static parameters to reduce a signal from the interfering UE, wherein the at least of processor obtains the one or more semi-static parameters by at least one of:
detecting the one or more semi-static parameters, the detecting including monitoring network signaling associated with the at least one neighboring eNB and the interfering UE;
receiving the one or more semi-static parameters via a backhaul; or
receiving the one or more semi-static parameters via a report from a UE associated with the eNB.

* * * * *